United States Patent
Barthes et al.

(10) Patent No.: US 11,927,810 B2
(45) Date of Patent: Mar. 12, 2024

(54) FIBER OPTIC ADAPTER ASSEMBLIES INCLUDING A CONVERSION HOUSING AND A RELEASE MEMBER

(71) Applicant: Corning Research & Development Corporation, Corning, NY (US)

(72) Inventors: Guy Barthes, Pontchateau (FR); Thierry Luc Alain Dannoux, Avon (FR); Michel Teva Menguy, La Chevallerais (FR); Felice Scotta, Savigny le Temple (FR)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 3 days.

(21) Appl. No.: 17/527,302

(22) Filed: Nov. 16, 2021

(65) Prior Publication Data

US 2022/0171140 A1     Jun. 2, 2022

Related U.S. Application Data

(60) Provisional application No. 63/119,605, filed on Nov. 30, 2020.

(51) Int. Cl.
   *G02B 6/38* (2006.01)
(52) U.S. Cl.
   CPC ......... *G02B 6/3825* (2013.01); *G02B 6/3831* (2013.01)
(58) Field of Classification Search
   CPC .. G02B 6/3825; G02B 6/3831; G02B 6/3887; G02B 6/3897; G02B 6/38
   See application file for complete search history.

(56) References Cited

U.S. PATENT DOCUMENTS

| | | |
|---|---|---|
| 3,074,107 A | 1/1963 | Kiyoshi et al. |
| 3,532,783 A | 10/1970 | Pusey et al. |

(Continued)

FOREIGN PATENT DOCUMENTS

| | | |
|---|---|---|
| AU | 2006232206 A1 | 10/2006 |
| CN | 1060911 A | 5/1992 |

(Continued)

OTHER PUBLICATIONS

Brown, "What is Transmission Welding?" Laser Plasti Welding website, 6 pgs, Retrieved on Dec. 17, 2018 from: http://www.laserplasticwelding.com/what-is-transmission-welding.

(Continued)

*Primary Examiner* — Jennifer Doan
(74) *Attorney, Agent, or Firm* — Tamika A. Crawl-Bey

(57) ABSTRACT

A fiber optic connector assembly includes a connector housing defining a locking portion defined on an outer surface of the connector housing, an adapter assembly selectively coupled to the connector housing, the adapter assembly including a conversion housing extending around the connector housing and defining a conversion front end, a retention housing including a connector retention feature engaged with the locking portion of the connector housing and the retention housing defining one or more outwardly-extending retention features, and a release member, engageable with the retention housing, where the release member is positionable between an engaged position, in which axial movement between the retention housing and the conversion housing is restricted, and a disengaged position, in which the retention housing is removable from the conversion housing.

13 Claims, 13 Drawing Sheets

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A | 11/1988 | Kosman et al. |
| 4,842,363 A | 6/1989 | Margolin et al. |
| 4,844,570 A | 7/1989 | Tanabe |
| 4,854,664 A | 8/1989 | McCartney |
| 4,856,867 A | 8/1989 | Gaylin |
| 4,877,303 A | 10/1989 | Caldwell et al. |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Ueda et al. |
| 5,315,679 A | 5/1994 | Baldwin et al. |
| 5,317,663 A | 5/1994 | Beard et al. |
| 5,321,917 A | 6/1994 | Franklin et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,789,701 A | 8/1998 | Wettengel et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Yuuki |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,193,421 B1 | 2/2001 | Tamekuni et al. |
| RE37,079 E | 3/2001 | Stephenson et al. |
| RE37,080 E | 3/2001 | Stephenson et al. |
| 6,200,040 B1 | 3/2001 | Edwards et al. |
| 6,206,579 B1 | 3/2001 | Selfridge et al. |
| 6,206,581 B1 | 3/2001 | Driscoll et al. |
| 6,220,762 B1 | 4/2001 | Kanai et al. |

(56) References Cited

U.S. PATENT DOCUMENTS

| | | |
|---|---|---|
| 6,224,268 B1 | 5/2001 | Manning et al. |
| 6,224,270 B1 | 5/2001 | Nakajima et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,287,016 B1 | 9/2001 | Weigel |
| 6,293,710 B1 | 9/2001 | Lampert et al. |
| 6,298,190 B2 | 10/2001 | Waldron et al. |
| 6,305,849 B1 | 10/2001 | Roehrs et al. |
| 6,321,013 B1 | 11/2001 | Hardwick et al. |
| 6,356,390 B1 | 3/2002 | Hall, Jr. |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,386,891 B1 | 5/2002 | Howard et al. |
| 6,402,388 B1 | 6/2002 | Imazu et al. |
| 6,404,962 B1 | 6/2002 | Hardwick et al. |
| 6,409,391 B1 | 6/2002 | Chang |
| D460,043 S | 7/2002 | Fan Wong |
| 6,422,764 B1 | 7/2002 | Marrs et al. |
| 6,427,035 B1 | 7/2002 | Mahony |
| 6,428,215 B1 | 8/2002 | Nault |
| 6,439,780 B1 | 8/2002 | Mudd et al. |
| 6,466,725 B2 | 10/2002 | Battey et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,533,468 B2 | 3/2003 | Nakajima et al. |
| 6,536,956 B2 | 3/2003 | Luther et al. |
| 6,539,147 B1 | 3/2003 | Mahony |
| 6,540,410 B2 | 4/2003 | Childers et al. |
| 6,542,652 B1 | 4/2003 | Mahony |
| 6,542,674 B1 | 4/2003 | Gimblet |
| 6,546,175 B1 | 4/2003 | Wagman et al. |
| 6,554,489 B2 | 4/2003 | Kent et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,629,782 B2 | 10/2003 | McPhee et al. |
| 6,644,862 B1 | 11/2003 | Berto et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,695,489 B2 | 2/2004 | Nault |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,146 B2 | 6/2004 | Parris |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,841,729 B2 | 1/2005 | Sakabe et al. |
| 6,848,838 B2 | 2/2005 | Doss et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,899,467 B2 | 5/2005 | McDonald et al. |
| 6,908,233 B2 | 6/2005 | Nakajima et al. |
| 6,909,821 B2 | 6/2005 | Ravasio et al. |
| 6,916,120 B2 | 7/2005 | Zimmel et al. |
| 6,918,704 B2 | 7/2005 | Marrs et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,011,454 B2 | 3/2006 | Caveney et al. |
| 7,013,074 B2 | 3/2006 | Battey et al. |
| 7,025,507 B2 | 4/2006 | De Marchi |
| 7,033,191 B1 | 4/2006 | Cao |
| 7,044,650 B1 | 5/2006 | Tran et al. |
| 7,052,185 B2 | 5/2006 | Rubino et al. |
| 7,079,734 B2 | 7/2006 | Seddon et al. |
| 7,088,899 B2 | 8/2006 | Reagan et al. |
| 7,090,406 B2 | 8/2006 | Melton et al. |
| 7,090,407 B2 | 8/2006 | Melton et al. |
| 7,090,409 B2 | 8/2006 | Nakajima et al. |
| 7,103,255 B2 | 9/2006 | Reagan et al. |
| 7,103,257 B2 | 9/2006 | Donaldson et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,118,283 B2 | 10/2006 | Nakajima et al. |
| 7,118,284 B2 | 10/2006 | Nakajima et al. |
| 7,120,347 B2 | 10/2006 | Blackwell et al. |
| 7,137,742 B2 | 11/2006 | Theuerkorn et al. |
| 7,146,089 B2 | 12/2006 | Reagan et al. |
| 7,146,090 B2 | 12/2006 | Vo et al. |
| 7,150,567 B1 | 12/2006 | Luther et al. |
| 7,165,893 B2 | 1/2007 | Schmitz |
| 7,171,102 B2 | 1/2007 | Reagan et al. |
| 7,178,990 B2 | 2/2007 | Caveney et al. |
| 7,184,634 B2 | 2/2007 | Hurley et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,204,644 B2 | 4/2007 | Barnes et al. |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,241,056 B1 | 7/2007 | Kuffel et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,270,487 B2 | 9/2007 | Billman et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| D574,775 S | 8/2008 | Amidon |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,467,896 B2 | 12/2008 | Melton et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |

(56) References Cited

U.S. PATENT DOCUMENTS

| | | | |
|---|---|---|---|
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,497,896 B2 | 3/2009 | Bromet et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,713,679 B2 | 5/2010 | Ishiduka et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,015 B2 | 8/2010 | Melton et al. |
| 7,785,019 B2 | 8/2010 | Lewallen et al. |
| 7,802,926 B2 | 9/2010 | Leeman et al. |
| 7,805,044 B2 | 9/2010 | Reagan et al. |
| 7,806,599 B2 | 10/2010 | Margolin et al. |
| 7,811,006 B2 | 10/2010 | Milette et al. |
| 7,820,090 B2 | 10/2010 | Morrow et al. |
| D626,506 S | 11/2010 | Giefers et al. |
| 7,844,148 B2 | 11/2010 | Jenkins et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,942,590 B2 | 5/2011 | Lu et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,556,645 B2 | 10/2013 | Crain |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,770,861 B2 | 7/2014 | Smith et al. |
| 8,770,862 B2 | 7/2014 | Lu et al. |
| D711,320 S | 8/2014 | Yang et al. |
| 8,798,430 B2 * | 8/2014 | Bryon .................. G02B 6/4475 385/100 |
| D712,360 S | 9/2014 | Su et al. |
| 8,821,036 B2 | 9/2014 | Shigehara |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,081,154 B2 | 7/2015 | Zimmel et al. |

(56) References Cited

U.S. PATENT DOCUMENTS

| | | |
|---|---|---|
| 9,146,364 B2 | 9/2015 | Chen et al. |
| D741,803 S | 10/2015 | Davidson, Jr. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| D749,519 S | 2/2016 | Su et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Power et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,444 B2 | 12/2016 | Barnette et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,551,842 B2 | 1/2017 | Theuerkorn |
| 9,557,504 B2 | 1/2017 | Holmberg et al. |
| 9,581,775 B2 | 2/2017 | Kondo et al. |
| 9,588,304 B2 | 3/2017 | Durrant et al. |
| 9,595,786 B1 | 3/2017 | Takano et al. |
| D783,618 S | 4/2017 | Wu et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Claessens et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| D810,029 S | 2/2018 | Robert et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,224 B2 | 3/2018 | Liu et al. |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,288,821 B2 | 5/2019 | Isenhour |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| D880,423 S | 4/2020 | Obata et al. |
| 10,613,278 B2 | 4/2020 | Kempeneers et al. |
| 10,620,388 B2 | 4/2020 | Isenhour et al. |
| 10,641,967 B1 | 5/2020 | Cote et al. |
| 10,656,347 B2 | 5/2020 | Kato |
| 10,677,998 B2 | 6/2020 | Van et al. |
| 10,680,343 B2 | 6/2020 | Scheucher |
| 10,712,516 B2 | 7/2020 | Courchaine et al. |
| 10,739,534 B2 | 8/2020 | Murray et al. |

(56) References Cited

U.S. PATENT DOCUMENTS

| | | |
|---|---|---|
| 10,746,939 B2 | 8/2020 | Lu et al. |
| 10,761,274 B2 | 9/2020 | Pepe et al. |
| 10,768,382 B2 | 9/2020 | Cote et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,487,073 B2 | 11/2022 | Ripumaree et al. |
| D982,519 S | 4/2023 | Gaidosch |
| 2001/0002220 A1 | 5/2001 | Throckmorton et al. |
| 2001/0012428 A1 | 8/2001 | Nakajima et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0122653 A1 | 9/2002 | Donaldson et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0080555 A1 | 5/2003 | Griffioen et al. |
| 2003/0086664 A1 | 5/2003 | Moisel et al. |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0047566 A1 | 3/2004 | McDonald et al. |
| 2004/0052474 A1 | 3/2004 | Lampert et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0206542 A1 | 10/2004 | Gladd et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0054237 A1 | 3/2005 | Gladd et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213897 A1 | 9/2005 | Palmer et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0025665 A1 | 2/2007 | Dean et al. |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0077010 A1 | 4/2007 | Melton et al. |
| 2007/0098343 A1 | 5/2007 | Miller et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044137 A1 | 2/2008 | Luther et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |

(56) References Cited

U.S. PATENT DOCUMENTS

| | | |
|---|---|---|
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0240658 A1 | 10/2008 | Leeman et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0041412 A1 | 2/2009 | Danley et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0054680 A1 | 3/2010 | Lochkovic et al. |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303416 A1 | 12/2010 | Danley et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0097050 A1 | 4/2011 | Blackwell et al. |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0002925 A1 | 1/2012 | Nakagawa |
| 2012/0008909 A1 | 1/2012 | Mertesdorf et al. |
| 2012/0045179 A1 | 2/2012 | Theuerkorn |
| 2012/0057830 A1 | 3/2012 | Taira et al. |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0034333 A1 | 2/2013 | Holmberg et al. |
| 2013/0051734 A1 | 2/2013 | Shen et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0044397 A1 | 2/2014 | Hikosaka et al. |
| 2014/0050446 A1 | 2/2014 | Chang |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0226945 A1 | 8/2014 | Claessens et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |

(56) References Cited

U.S. PATENT DOCUMENTS

| | | |
|---|---|---|
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0144883 A1 | 5/2015 | Sendelweck |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0286011 A1 | 10/2015 | Nhep |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0154186 A1 | 6/2016 | Gimblet et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van et al. |
| 2016/0209602 A1 | 7/2016 | Theuerkorn |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2016/0349458 A1 | 12/2016 | Murray et al. |
| 2016/0356963 A1 | 12/2016 | Liu et al. |
| 2017/0023758 A1 | 1/2017 | Reagan et al. |
| 2017/0038538 A1 | 2/2017 | Isenhour et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0285279 A1 | 10/2017 | Daems et al. |
| 2017/0288315 A1 | 10/2017 | Scheucher |
| 2017/0293091 A1 | 10/2017 | Lu et al. |
| 2017/0307828 A1 | 10/2017 | Elenbaas |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0003902 A1 | 1/2018 | Rosson et al. |
| 2018/0031774 A1 | 2/2018 | Van et al. |
| 2018/0079569 A1 | 3/2018 | Simpson |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0267265 A1 | 9/2018 | Zhang et al. |
| 2018/0321448 A1 | 11/2018 | Wu et al. |
| 2018/0329149 A1 | 11/2018 | Mullaney et al. |
| 2018/0329153 A1 | 11/2018 | Verheyden |
| 2018/0348447 A1 | 12/2018 | Nhep et al. |
| 2018/0372962 A1 | 12/2018 | Isenhour et al. |
| 2019/0004251 A1 | 1/2019 | Dannoux et al. |
| 2019/0004252 A1 | 1/2019 | Rosson |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0014987 A1 | 1/2019 | Sasaki et al. |
| 2019/0018210 A1 | 1/2019 | Coan et al. |
| 2019/0033531 A1 | 1/2019 | Taira et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0258010 A1 | 8/2019 | Anderson et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0361177 A1 | 11/2019 | Aoshima et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Hill et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116950 A1* | 4/2020 | Wong .................. G02B 6/389 |
| 2020/0116952 A1 | 4/2020 | Rosson |
| 2020/0116953 A1 | 4/2020 | Rosson |
| 2020/0116954 A1 | 4/2020 | Rosson |

(56) References Cited

U.S. PATENT DOCUMENTS

| | | |
|---|---|---|
| 2020/0116958 A1 | 4/2020 | Dannoux et al. |
| 2020/0116962 A1 | 4/2020 | Dannoux et al. |
| 2020/0124805 A1 | 4/2020 | Rosson et al. |
| 2020/0124812 A1 | 4/2020 | Dannoux et al. |
| 2020/0132939 A1 | 4/2020 | Coenegracht et al. |
| 2020/0132941 A1 | 4/2020 | Otsuka et al. |
| 2020/0150356 A1 | 5/2020 | Lu |
| 2020/0174201 A1 | 6/2020 | Cote et al. |
| 2020/0183097 A1 | 6/2020 | Chang et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0301090 A1 | 9/2020 | Petersen et al. |
| 2020/0348476 A1 | 11/2020 | Hill et al. |
| 2020/0371306 A1 | 11/2020 | Mosier et al. |
| 2020/0393629 A1 | 12/2020 | Hill et al. |
| 2021/0149140 A1 | 5/2021 | Jensen |
| 2021/0278607 A1 | 9/2021 | Cote et al. |
| 2021/0278687 A1 | 9/2021 | Tsuchiya |
| 2021/0288609 A1 | 9/2021 | Yan et al. |
| 2022/0236497 A1 | 7/2022 | Calvin et al. |

FOREIGN PATENT DOCUMENTS

| | | |
|---|---|---|
| CN | 1071012 A | 4/1993 |
| CN | 1213783 A | 4/1999 |
| CN | 1231430 A | 10/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 103782209 A | 5/2014 |
| CN | 104007514 A | 8/2014 |
| CN | 104064903 A | 9/2014 |
| CN | 104280830 A | 1/2015 |
| CN | 104603656 A | 5/2015 |
| CN | 104704411 A | 6/2015 |
| CN | 105467529 A | 4/2016 |
| CN | 105683795 A | 6/2016 |
| CN | 110608208 A | 12/2019 |
| CN | 110954996 A | 4/2020 |
| DE | 3537684 A1 | 4/1987 |
| DE | 3737842 C1 | 9/1988 |
| DE | 19805554 A1 | 8/1998 |
| EP | 0012566 A1 | 6/1980 |
| EP | 0026553 A1 | 4/1981 |
| EP | 0122566 A2 | 10/1984 |
| EP | 0130513 A2 | 1/1985 |
| EP | 0244791 A2 | 11/1987 |
| EP | 0462362 A2 | 12/1991 |
| EP | 0468671 A1 | 1/1992 |
| EP | 0469671 A1 | 2/1992 |
| EP | 0547778 A1 | 6/1993 |
| EP | 0547788 A1 | 6/1993 |
| EP | 0762171 A1 | 3/1997 |
| EP | 0782025 A1 | 7/1997 |
| EP | 0855610 A2 | 7/1998 |
| EP | 0856751 A1 | 8/1998 |
| EP | 0856761 A1 | 8/1998 |
| EP | 0940700 A2 | 9/1999 |
| EP | 0949522 A2 | 10/1999 |
| EP | 0957381 A1 | 11/1999 |
| EP | 0997757 A2 | 5/2000 |
| EP | 1065542 A1 | 1/2001 |
| EP | 1122566 A2 | 8/2001 |
| EP | 1243957 A2 | 9/2002 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3207223 A1 | 8/2017 |
| EP | 3234672 A1 | 10/2017 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| EP | 3403125 B1 | 7/2021 |
| ES | 1184287 U | 5/2017 |
| FR | 2485754 A1 | 12/1981 |
| GB | 2022284 A | 12/1979 |
| GB | 2154333 A | 9/1985 |
| GB | 2169094 A | 7/1986 |
| GB | 6192781 | 2/2022 |
| GB | 6192782 | 2/2022 |
| GB | 6192783 | 2/2022 |
| GB | 6192784 | 2/2022 |
| IN | 201404194 Y | 2/2010 |
| JP | 52-030447 A | 3/1977 |
| JP | 58-142308 A | 8/1983 |
| JP | 61-145509 A | 7/1986 |
| JP | 62-054204 A | 3/1987 |
| JP | 63-020111 A | 1/1988 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-106765 A | 4/1993 |
| JP | 05-142439 A | 6/1993 |
| JP | 05-297246 A | 11/1993 |
| JP | 06-320111 A | 11/1994 |
| JP | 07-318758 A | 12/1995 |
| JP | 08-050211 A | 2/1996 |
| JP | 08-054522 A | 2/1996 |
| JP | 08-062432 A | 3/1996 |
| JP | 08-292331 A | 11/1996 |
| JP | 09-049942 A | 2/1997 |
| JP | 09-135526 A | 5/1997 |
| JP | 09-159867 A | 6/1997 |

(56) References Cited

FOREIGN PATENT DOCUMENTS

| | | |
|---|---|---|
| JP | 09-203831 A | 8/1997 |
| JP | 09-325223 A | 12/1997 |
| JP | 09-325249 A | 12/1997 |
| JP | 10-170781 A | 6/1998 |
| JP | 10-332953 A | 12/1998 |
| JP | 10-339826 A | 12/1998 |
| JP | 11-064682 A | 3/1999 |
| JP | 11-119064 A | 4/1999 |
| JP | 11-248979 A | 9/1999 |
| JP | 11-271582 A | 10/1999 |
| JP | 11-281861 A | 10/1999 |
| JP | 11-326693 A | 11/1999 |
| JP | 11-337768 A | 12/1999 |
| JP | 11-352368 A | 12/1999 |
| JP | 2000-002828 A | 1/2000 |
| JP | 2001-116968 A | 4/2001 |
| JP | 2001-290051 A | 10/2001 |
| JP | 2002-520987 A | 7/2002 |
| JP | 3296698 B2 | 7/2002 |
| JP | 2002-250987 A | 9/2002 |
| JP | 2003-009331 A | 1/2003 |
| JP | 2003-070143 A | 3/2003 |
| JP | 2003-121699 A | 4/2003 |
| JP | 2003-177279 A | 6/2003 |
| JP | 2003-302561 A | 10/2003 |
| JP | 2004-361521 A | 12/2004 |
| JP | 2005-024789 A | 1/2005 |
| JP | 2005-031544 A | 2/2005 |
| JP | 2005-077591 A | 3/2005 |
| JP | 2005-114860 A | 4/2005 |
| JP | 2005-520987 A | 7/2005 |
| JP | 2006-023502 A | 1/2006 |
| JP | 2006-146084 A | 6/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009-265208 A | 11/2009 |
| JP | 2010-152084 A | 7/2010 |
| JP | 2010-191420 A | 9/2010 |
| JP | 2011-018003 A | 1/2011 |
| JP | 2011-033698 A | 2/2011 |
| JP | 2013-041089 A | 2/2013 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 5537852 B2 | 7/2014 |
| JP | 5538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 2016/168389 A1 | 10/2016 |
| JP | 3207223 U | 11/2016 |
| JP | 3207233 U | 11/2016 |
| KR | 10-2013-0081087 A | 7/2013 |
| NO | 02/25340 A1 | 3/2002 |
| NO | 2008/150408 A1 | 12/2008 |
| NO | 2012/044741 A1 | 4/2012 |
| NO | 2015/197588 A1 | 12/2015 |
| TW | 222688 B | 4/1994 |
| WO | 94/25885 A1 | 11/1994 |
| WO | 98/36304 A1 | 8/1998 |
| WO | 01/27660 A2 | 4/2001 |
| WO | 01/92927 A2 | 12/2001 |
| WO | 01/92937 A1 | 12/2001 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2013/177016 A1 | 11/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/047508 A1 | 4/2015 |
| WO | 2015/144883 A1 | 10/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/005789 A1 | 1/2019 |
| WO | 2019/006121 A1 | 1/2019 |
| WO | 2019/006176 A1 | 1/2019 |
| WO | 2019/006191 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |
| WO | 2020/242847 A1 | 12/2020 |
| WO | 2022/115271 A1 | 6/2022 |

OTHER PUBLICATIONS

Clearfield, "Fieldshield Optical Fiber Protection System: Installation Manual." for part No. 016164. Last Updated Dec. 2014. 37 pgs.

Clearfield, "FieldShield SC and LC Pushable Connectors," Last Updated Jun. 1, 2018, 2 pgs.

Clearfield, "FieldShield SmarTerminal: Hardened Pushable Connectors" Last Updated Jun. 29, 2018, 2 pgs.

Corning Cable Systems, "SST Figure-8 Drop Cables 1-12 Fibers", Preliminary Product Specifications, 11 pgs. (2002).

Corning Cable Systems, "SST-Drop (armor) Cables 1-12 Fibers", Product Specifications, 2 pgs. (2002).

(56) References Cited

OTHER PUBLICATIONS

Digital Optical Audio Cable Toslink Cable. Date: Jun. 27, 2019 [online], [Site visited Mar. 2, 2021], Available from Internet URL: https://www.amazon.com/dp/B07TJMP4TP/ (Year: 2019).

Faulkner et al. "Optical networks for local lopp applications," J. Lightwave Technol.0733-8724 7(11), 17411751 (1989).

Fiber Systems International: Fiber Optic Solutions, data, "TFOCA-11 4-Channel Fiber Optic Connector" sheet. 2 pgs.

Gold Plated Toslink. Date: Feb. 5, 2015. [online], [Site visited Mar. 2, 2021], Available from Internet URL: https://www.amazon.com/dp/B00T8HWV62/ (Year: 2015).

Infolite—Design and Data Specifications, 1 pg. Retrieved Feb. 21, 2019.

Nawata, "Multimode and Single-Mode Fiber Connectors Technology"; IEEE Journal of Quantum Electronics, vol. QE-16, No. 6 Published Jun. 1980.

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Schneier, Bruce; "Applied Cryptography: Protocols, Algorithms, and Source Code in C," Book. 1995 SEC. 10.3, 12.2, 165 PGS.

Stratos: Lightwave., "Innovation Brought to Light", Hybrid HMA Series, Hybrid Multi Application, 2 pgs.

Stratos: Ughtwave., "Innovation Brought to Light", Hybrid HMA Series, Hybrid Multi Application, 2 pgs.

UPC Optic Fiber Quick Connector. Date: May 13, 2016 [online], [Site visited Mar. 2, 2021], Available from Internet URL: https://www.amazon.com/dp/B01FLUV5DE/ (Year: 2016).

Wang et al. "Opto-VLSI-based dynamic optical splitter," Electron. Lett.0013-5194 10.1049/el:20046715 40(22), 14451446 (2004).

Wang et al. "Opto-VLSI-based dynamic optical splitter," Electron. Lett.0013-5194 10.1049/el:20046715 40(22), F14451446 (2004).

Xiao et al. "1 xN wavelength selective adaptive optical power splitter for wavelength-division-multiplexed passive optical networks," Optics & Laser Technology 68, pp. 160-164, May 2015.

\* cited by examiner

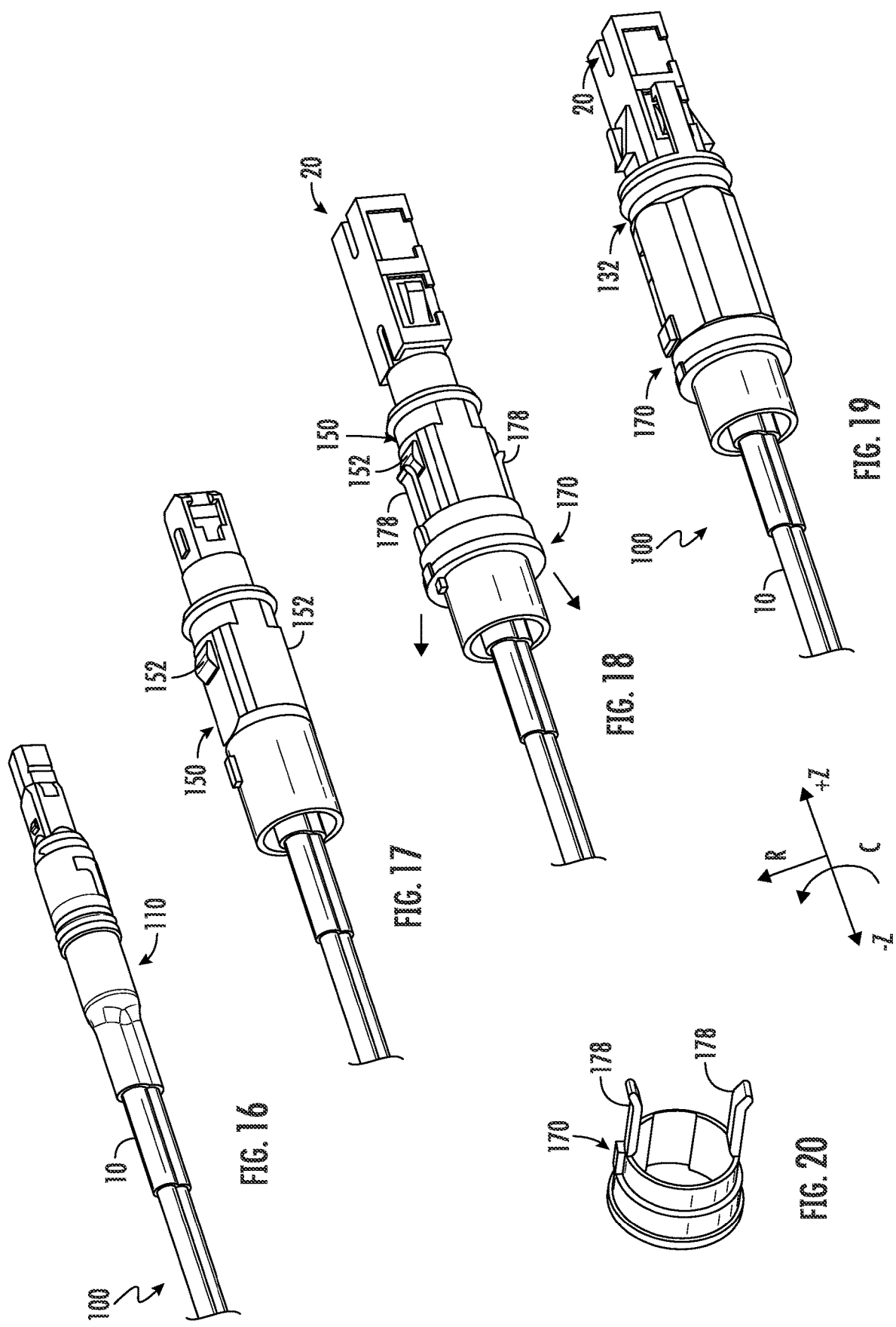

FIBER OPTIC ADAPTER ASSEMBLIES INCLUDING A CONVERSION HOUSING AND A RELEASE MEMBER

CROSS-REFERENCE TO RELATED APPLICATIONS

This application claims the benefit of priority under 35 U.S.C. § 119 of U.S. Provisional Application Ser. No. 63/119,605, filed Nov. 30, 2020, the content of which is relied upon and incorporated herein by reference in its entirety.

FIELD

The present disclosure generally relates to fiber optic adapter assemblies for connecting optical fibers, and more particularly to fiber optic adapter assemblies, including a conversion housing and a release member.

BACKGROUND

Optical fibers are used in an increasing number and variety of applications, such as a wide variety of telecommunications and data transmission applications. As a result, fiber optic networks include an ever increasing number of terminated optical fibers and fiber optic cables that can be conveniently and reliable mated with corresponding optical receptacles in the network. These terminated optical fibers and fiber optic cables are available in a variety of connectorized formats including, for example, hardened OptiTap® and OptiTip® connectors, field-installable UniCam® connectors, preconnectorized single or multi-fiber cable assemblies with SC, FC, or LC connectors, etc., all of which are available from Corning Incorporated, with similar products available from other manufacturers, as is well documented in the patent literature.

The optical receptacles with which the aforementioned terminated fibers and cables are coupled are commonly provided at optical network units (ONUs), network interface devices (NIDs), and other types of network devices or enclosures, and often require hardware that is sufficiently robust to be employed in a variety of environments under a variety of installation conditions. These conditions may be attributable to the environment in which the connectors are employed, or the habits of the technicians handling the hardware. Consequently, there is a continuing drive to enhance the robustness of these connectorized assemblies, while preserving quick, reliable, and trouble-free optical connection to the network.

SUMMARY

Fiber optic connectors, connectorized cable assemblies, closure assemblies, and methods for connecting fiber optic connectors to, and disconnecting fiber optic connectors from closure assemblies are disclosed herein.

In a first aspect A1, the present disclosure provides a fiber optic connector assembly comprising a connector housing defining a locking portion defined on an outer surface of the connector housing, an adapter assembly selectively coupled to the connector housing, the adapter assembly comprising a conversion housing extending around the connector housing and defining a conversion front end, a retention housing comprising a connector retention feature engaged with the locking portion of the connector housing and the retention housing defining one or more outwardly-extending retention features, and a release member, engageable with the retention housing, wherein the release member is positionable between an engaged position, in which axial movement between the retention housing and the conversion housing is restricted, and a disengaged position, in which the retention housing is removable from the conversion housing.

In a second aspect A2, the present disclosure provides the fiber optic connector assembly of aspect A1, wherein the one or more outwardly-extending retention features of the retention housing are engaged with the conversion housing with the release member in the disengaged position and disengaged with the conversion housing with the release member in the engaged position.

In a third aspect A3, the present disclosure provides the fiber optic connector assembly of aspect A2, wherein the conversion housing defines a forwardly-facing release surface engaged with the one or more outwardly-extending retention features of the retention housing.

In a fourth aspect A4, the present disclosure provides the fiber optic connector assembly of aspect A3, wherein the forwardly-facing release surface faces inward in a radial direction.

In a fifth aspect A5, the present disclosure provides the fiber optic connector assembly of aspect either of aspects A3 or A4, wherein the release member defines a release member inner surface and one or more installation grooves extending into the release member inner surface, wherein the one or more installation grooves are spaced apart from the forwardly-facing release surface in a circumferential direction.

In a sixth aspect A6, the present disclosure provides the fiber optic connector assembly of any of aspects A2-A5, wherein the release member defines an annular shape positioned around the retention housing.

In a seventh aspect A7, the present disclosure provides the fiber optic connector assembly of any of aspects A2-A6, wherein the one or more outwardly-extending retention features of the retention housing define a rearwardly-facing retention engagement face engaged with the conversion housing with the release member in the engaged position.

In an eighth aspect A8, the present disclosure provides the fiber optic connector assembly of aspect A2, wherein the conversion housing defines a forwardly-facing release surface that is engaged with the one or more outwardly-extending retention features of the retention housing with the release member in the disengaged position.

In a ninth aspect A9, the present disclosure provides the fiber optic connector assembly of any of aspects A1-A8, further comprising a rear seal engaged with the retention housing and the conversion housing, wherein the rear seal at least partially encapsulates the release member.

In a tenth aspect A10, the present disclosure provides the fiber optic connector assembly of any of aspects A1-A9, further comprising a boot cover engaged with the retention housing and the conversion housing, wherein the boot cover at least partially encapsulates the release member.

In an eleventh aspect A11, the present disclosure provides the fiber optic connector assembly of aspect A1, wherein the release member is engaged with the conversion housing in the engaged position, and the release member is disengaged from the conversion housing in the disengaged position.

In a twelfth aspect A12, the present disclosure provides the fiber optic connector assembly of aspect A11, wherein the release member defines one or more outwardly-extending release tabs, and wherein the one or more outwardly-extending release tabs are positioned between the one or more outwardly-extending retention features of the retention housing and the conversion housing in the engaged position.

In a thirteenth aspect A13, the present disclosure provides the fiber optic connector assembly of aspect A12, wherein the conversion housing defines a conversion sidewall extending in an axial direction and an aperture extending through the conversion sidewall.

In a fourteenth aspect A14, the present disclosure provides the fiber optic connector assembly of aspect A13, wherein at least a portion of one or more outwardly-extending release tabs of the release member are positioned at least partially within the aperture in the engaged position, and wherein the one or more outwardly-extending release tabs of the release member are spaced apart from the aperture in the disengaged position.

In a fifteenth aspect A15, the present disclosure provides a method for disconnecting a fiber optic connector from a conversion housing, the method comprising moving a release member in an axial direction with respect to a retention housing engaged with a connector housing, wherein the retention housing comprises a connector retention feature engaged with a rotationally-discrete locking portion of the connector housing, engaging an outwardly-extending retention feature of the retention housing with the release member thereby deflecting the outwardly-extending retention feature inwardly, and removing the retention housing from the conversion housing, thereby removing the connector housing from the conversion housing.

In a sixteenth aspect A16, the present disclosure provides the method of aspect A15, wherein moving the release member in the axial direction comprises moving the release member toward a front end of the connector housing.

In a seventeenth aspect A17, the present disclosure provides the method of either of aspects A15 or A16, wherein deflecting the outwardly-extending retention feature comprises moving the outwardly-extending retention feature of the retention housing out of engagement with a forwardly-facing release surface of the conversion housing.

In an eighteenth aspect A18, the present disclosure provides a method for disconnecting a fiber optic connector from a conversion housing, the method comprising moving a release member in an axial direction with respect to a retention housing engaged with a connector housing, wherein the retention housing comprises a connector retention feature engaged with a rotationally-discrete locking portion of the connector housing, disengaging an outwardly-extending release tab of the release member from an aperture of the conversion housing, and removing the retention housing from the conversion housing.

In a nineteenth aspect A19, the present disclosure provides the method of aspect A18, wherein moving the release member in the axial direction comprises moving the release member away from a front end of the connector housing.

In a twentieth aspect A20, the present disclosure provides the method of either of aspects A18 or A19, wherein disengaging the outwardly-extending release tab of the release member from the aperture of the conversion housing comprises deflecting the outwardly-extending release tab inwardly.

In a twenty-first aspect A21, the present disclosure provides the method of any of aspects A18-A20, wherein disengaging the outwardly-extending release tab of the release member from the aperture of the conversion housing further comprises moving the outwardly-extending release tab away from an outwardly-extending retention feature of the retention housing.

Additional features of fiber optic connectors, connectorized cable assemblies, closure assemblies, and methods for connecting fiber optic connectors to, and disconnecting fiber optic connectors from closure assemblies will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 16 schematically depicts an isometric view of a connector housing of the fiber optic connector assembly of FIG. 15, according to one or more embodiments shown and described herein;

FIG. 17 schematically depicts an isometric view of the connector housing and the retention housing of the fiber optic connector assembly of FIG. 15, according to one or more embodiments shown and described herein;

FIG. 18 schematically depicts an isometric view of the connector housing, the retention housing, and the release member of the fiber optic connector assembly of FIG. 15, according to one or more embodiments shown and described herein;

FIG. 19 schematically depicts an isometric view of the connector housing, the retention housing, the release member, and the conversion housing of the fiber optic connector assembly of FIG. 15, according to one or more embodiments shown and described herein;

FIG. 20 schematically depicts an isometric view of the release member of FIG. 18, according to one or more embodiments shown and described herein;

DETAILED DESCRIPTION

Figure 1:
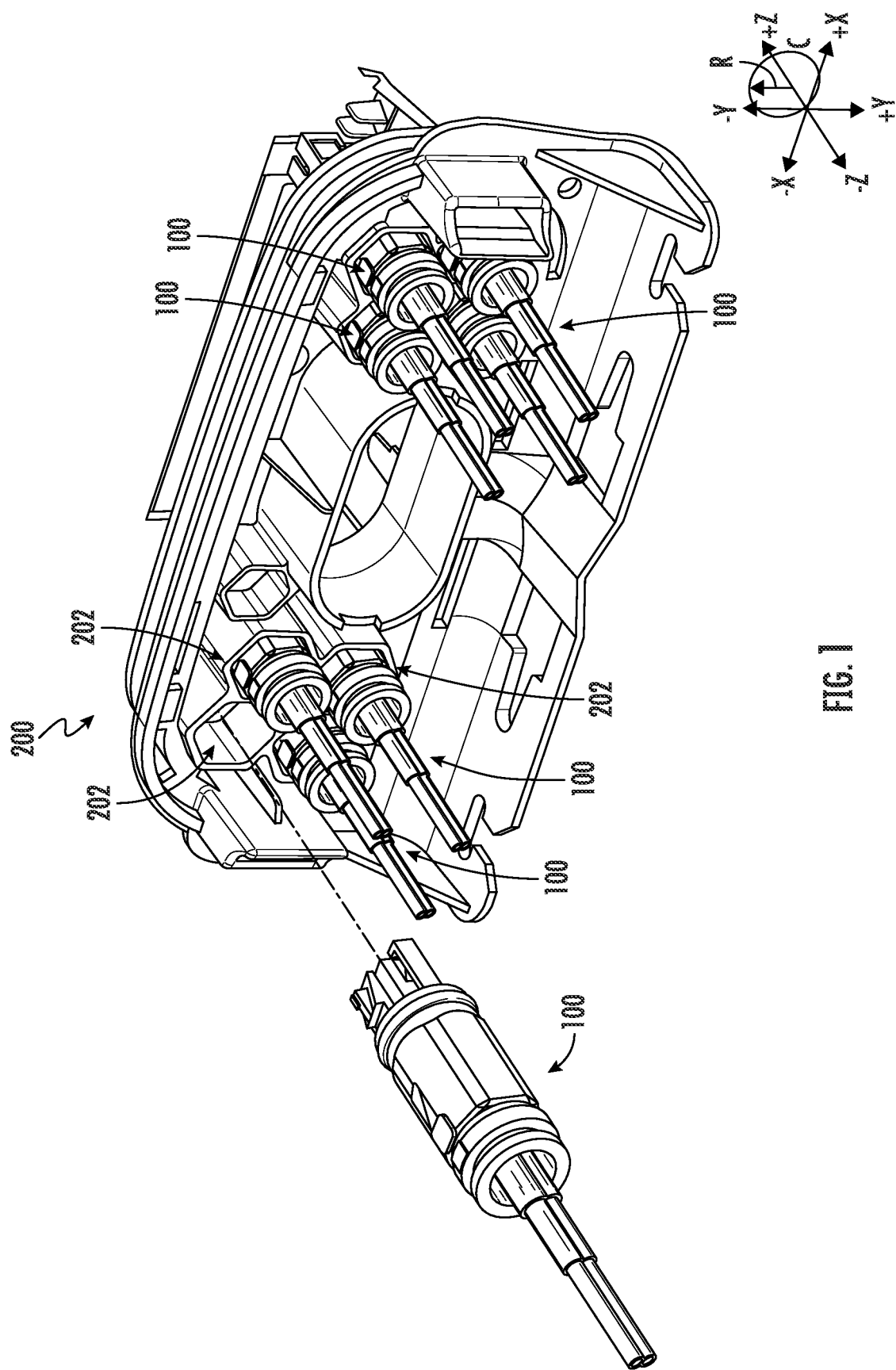
FIG. 1 schematically depicts an isometric view of a closure and fiber optic connector assemblies inserted at least partially into the closure, according to one or more embodiments shown and described herein.

Reference will now be made in detail to embodiments of optical adapter assemblies, examples of which are illustrated in the accompanying drawings. Whenever possible, the same reference numerals will be used throughout the drawings to refer to the same or like parts. Embodiments described herein are directed to fiber optic connector assemblies including a connector housing and an adapter assembly including a conversion housing, a retention housing, and a release member. The conversion housing may generally permit the connector housing to be engaged with a dissimilar coupling, for example of a closure. The connector housing may be selectively coupled to, and may be releasable from the conversion housing via the release member, thereby allowing the connector housing to be selectively coupled to and released from the dissimilar coupling and/or closure.

As used herein, the term "longitudinal direction" refers to the forward-rearward direction of the components described herein (i.e., in the +/−z-direction as depicted). The term "lateral direction" refers to the cross-wise direction of the components (i.e., in the +/−x-direction as depicted), and is transverse to the longitudinal direction. The term "vertical direction" refers to the upward-downward direction of the components (i.e., in the +/−y-direction as depicted). The term "axial direction" generally refers to the longitudinal direction of fiber optic connector assemblies described herein. The term "radial direction" refers to the direction extending outwardly from the longitudinal direction of fiber optic connector assemblies described herein (i.e., in the R-direction as depicted). The term "circumferential direction refers to the direction extending around the longitudinal direction of fiber optic connector assemblies described herein (i.e., in the C-direction as depicted).

Referring initially to FIG. 1, a closure 200 is depicted with multiple fiber optic connector assemblies 100 inserted at least partially into the closure 200. In embodiments, the closure 200 may facilitate the connection of multiple fiber optic connector assemblies 100. In some embodiments, the closure 200 may be a boite de protection d'epissurages optiques (BPEO) closure, however, it should be understood that this is merely an example. As shown in FIG. 1, closures 200 may include multiple closure openings 202 that can each receive a fiber optic connector assembly 100. In embodiments, the closure openings 202 may be positioned adjacent to one another in the vertical direction and/or in the lateral direction (i.e., in the +/−y-direction and the +/−x-direction as depicted). In other words, the closure openings 202 may be positioned on top of one another in the vertical direction, and may be placed side-by-side to one another in the lateral direction (i.e., in the +/−y-direction and the +/−x-direction as depicted, respectively). By positioning the closure openings 202 adjacent to one another in the vertical direction and the lateral direction (i.e., in the +/−y-direction and the +/−x-direction as depicted), multiple fiber optic connector assemblies 100 may be inserted into the closure 200 even when the closure 200 has a comparatively small footprint evaluated in the vertical and lateral directions. In other words, by positioning the closure openings 202 adjacent to one another in the vertical direction and the lateral direction, the number of fiber optic connector assemblies 100 inserted into the closure 200 may be increased as compared to similarly-sized closures having closure openings that are not positioned adjacent to one another in the vertical direction and the lateral direction.

However, with fiber optic connector assemblies 100 positioned adjacent to one another in the vertical direction and the lateral direction (i.e., in the +/−y-direction and the +/−x-direction as depicted), it may be difficult for users to insert and remove the fiber optic connector assemblies 100 from the closure 200. In particular, space between adjacent fiber optic connector assemblies 100 in the vertical direction and the lateral direction (i.e., in the +/−y-direction and the +/−x-direction as depicted, respectively) may be minimal. Minimal distance between the fiber optic connector assemblies 100 may make it difficult for a user to manipulate the fiber optic connector assemblies 100 to remove or insert the fiber optic connector assemblies 100 to the closure 200.

Figure 2:
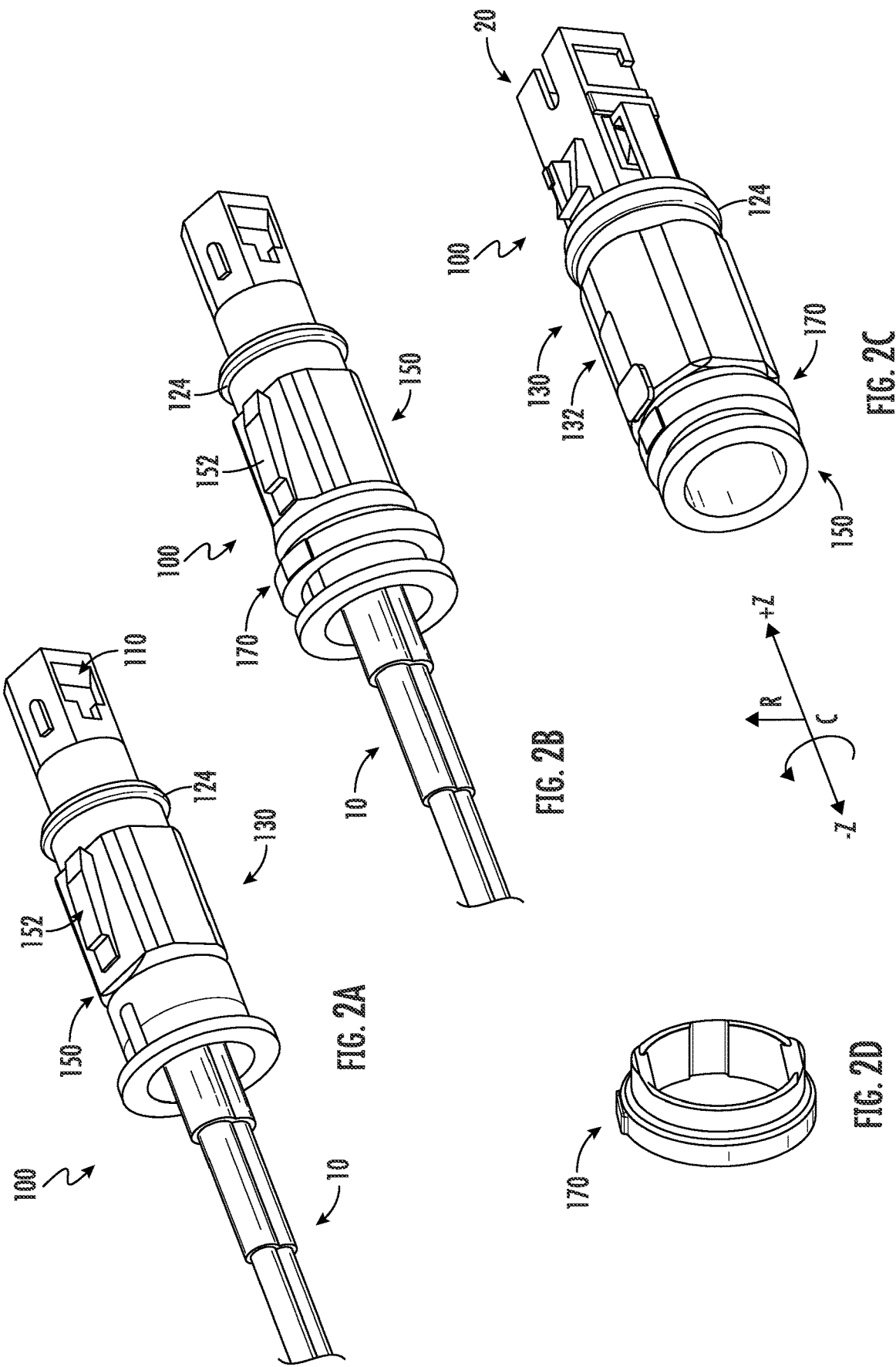
FIG. 2A schematically depicts an isometric view of a fiber optic connector assembly including a connector housing and a retention housing, according to one or more embodiments shown and described herein.
FIG. 2B schematically depicts an isometric view of the fiber optic connector assembly of FIG. 2A including the connector housing, the retention housing, and a release member, according to one or more embodiments shown and described herein.
FIG. 2C schematically depicts an isometric view of the fiber optic connector assembly of FIG. 2A including the retention housing, the release member, and a conversion housing engaged with a coupling, according to one or more embodiments shown and described herein.
FIG. 2D schematically depicts an isometric view of the release member of FIG. 2B, according to one or more embodiments shown and described herein.

Referring to FIGS. 2A-2D, isometric views of a fiber optic connector assembly 100 of a fiber optic cable 10 are depicted. In embodiments, the fiber optic connector assembly 100 includes a connector housing 110 and an adapter assembly 130 including a conversion housing 132, a retention housing 150, and a release member 170. Referring particularly to FIG. 2A, in embodiments, the connector housing 110 may be at least partially inserted within the retention housing 150. In embodiments, the retention housing 150 includes one or more outwardly-extending retention features 152 that are selectively engageable with the conversion housing 132, as described in greater detail herein.

Referring particularly to FIG. 2B, in embodiments, the release member 170 is engageable with the retention housing 150. For example, as shown in the embodiment depicted in FIG. 2B, the release member 170 may be positioned at least partially around the retention housing 150. In some embodiments, the release member 170 defines an annular shape, and the connector housing 110 and the retention housing 150 may be inserted at least partially into the release member 170, however, it should be understood that this is merely an example. In embodiments, the release member 170 is selectively engageable with the one or more outwardly-extending retention features 152 of the retention housing 150, as described in greater detail herein.

Referring to FIG. 2C, in embodiments, the retention housing 150 may be inserted at least partially within the conversion housing 132. The conversion housing 132, in embodiments, is engageable with a coupling 20. In the embodiment depicted in FIGS. 2C, the coupling 20 is embodied as an SC coupling, however, it should be understood that this is merely an example, and the conversion housing 132 may be engageable with any suitable coupling, for example and without limitation, an LC coupling or the like. In some embodiments, couplings 20 may be positioned at least partially within the closure openings 202 (FIG. 1), and the fiber optic connector assemblies 100 inserted into the closure 200 (FIG. 1) may each interface with a coupling 20.

Figure 3:
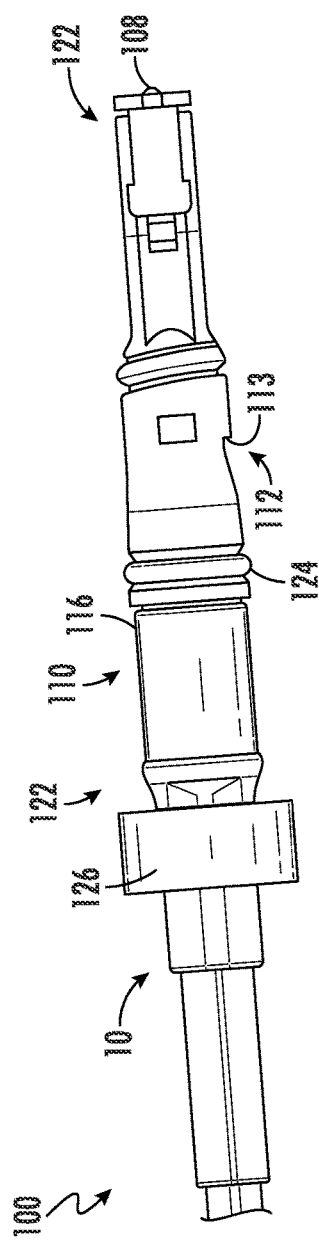
FIG. 3 schematically depicts a side view of the connector housing of the fiber optic connector assembly of FIG. 2A, according to one or more embodiments shown and described herein.

Referring to FIG. 3, a side view of the connector housing 110 is schematically depicted. In some embodiments, the fiber optic connector assembly 100 may include one or more sealing elements 124 engaged with the connector housing 110. The one or more sealing elements 124 may include O-rings or the like that may assist in restricting environmental elements (e.g., water, humidity, etc.) from reaching portions of the connector housing 110 when assembled to the retention housing 150 (FIG. 2A).

In some embodiments, the fiber optic connector assembly 100 may further include a rear seal 126 positioned at least partially around the connector housing 110. The rear seal 126 may be restrict environmental elements (e.g., water, humidity, etc.) from passing between the connector housing 110 and the retention housing 150 (FIG. 2A), and may include any suitable material for restricting the passage of environmental elements, for example and without limitation, a polymer or the like.

In embodiments, the connector housing 110 defines an outer surface 116 extending from a connector housing rear end 122 to a connector housing front end 120 in the longitudinal direction (i.e., in the +/−z-direction as depicted). In embodiments, a ferrule 108 may be positioned at the connector housing front end 120. An optical fiber may extend through the ferrule 108 in the longitudinal direction (i.e., in the +/−z-direction as depicted). In embodiments in which the fiber optic cable 10 includes a single optical fiber, the optical fiber may be coaxial with the longitudinal direction (i.e., the +/−z-direction as depicted). For multifiber cables, this alignment will be offset for one, more than one, or all of the optical fibers of the fiber optic cable 10.

In embodiments, the connector housing 110 defines a locking portion 112 on the outer surface 116 of the connector housing 110. In some embodiments, the locking portion 112 defines a connector locking face 113 that, in the embodiment depicted in FIG. 3 faces rearwardly in the longitudinal direction (i.e., in the −z-direction as depicted). In some embodiments, the locking portion 112 is rotationally discrete on the outer surface 116. As used herein, the term "rotationally" discrete represents a limited width-wise extent along the outer surface 116 of the connector housing 110, as the connector housing 110 is rotated in the circumferential direction C.

Figure 4:
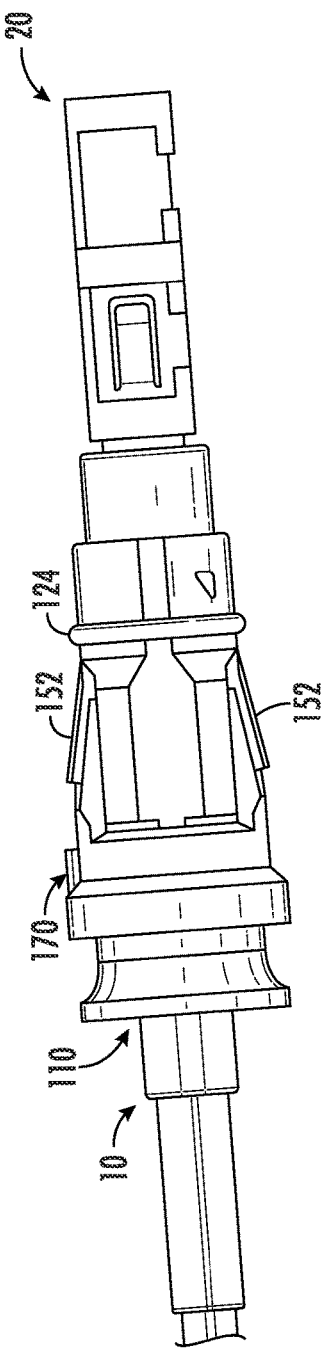
FIG. 4 schematically depicts a side view of the connector housing, the retention housing, and the release member of the fiber optic connector assembly of FIG. 3, according to one or more embodiments shown and described herein.

Referring to FIG. 4, a side view of the connector housing 110, the retention housing 150, and the release member 170 is schematically depicted. As shown in FIG. 4, the release member 170 is selectively engaged with a pair of outwardly-extending retention features 152 of the retention housing 150. While in the embodiment depicted in FIG. 4 the retention housing 150 includes two outwardly-extending retention features 152, it should be understood that this is merely an example, and in embodiments, the retention housing 150 may include a single outwardly-extending retention feature 152 or any suitable number of outwardly-extending retention features 152.

Figure 5:
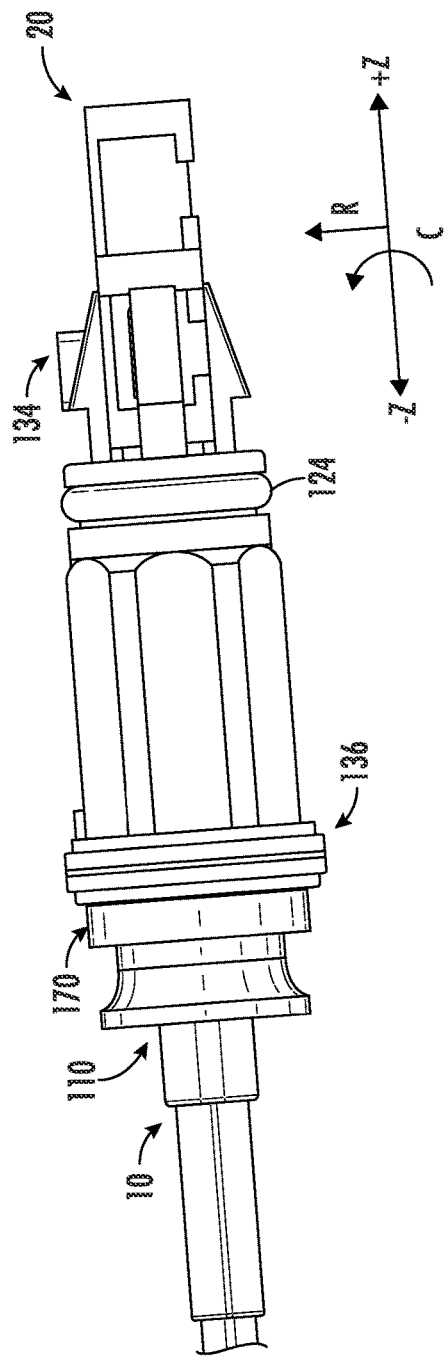
FIG. 5 schematically depicts a side view of the connector housing, the retention housing, and the release member of FIG. 4, with the conversion housing engaged with the coupling, according to one or more embodiments shown and described herein.

Referring to FIG. 5, a side view of the connector housing 110, the conversion housing 132, and the coupling 20 is schematically depicted. In embodiments, the conversion housing 132 extends between a conversion front end 134 and a conversion rear end 136 in the longitudinal direction (i.e., in the +/−z-direction as depicted). As shown in FIG. 5, the conversion front end 134 is engageable with the coupling 20.

Figure 6B:
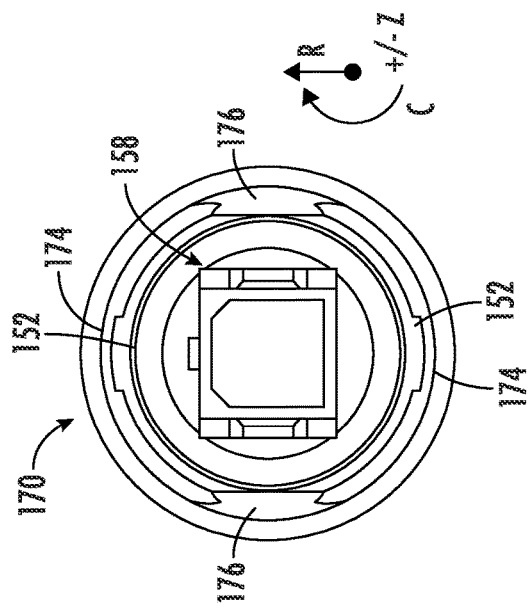
FIG. 6B schematically depicts a front view of the retention housing and the release member of FIG. 6A, according to one or more embodiments shown and described herein.
Figure 6A:
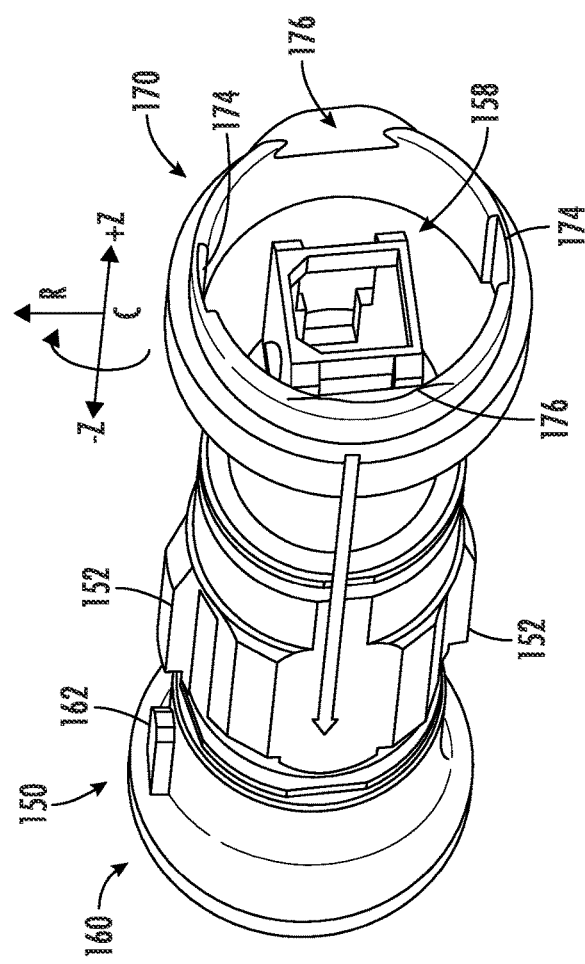
FIG. 6A schematically depicts a front perspective view of the retention housing and the release member of the fiber optic connector assembly of FIG. 5, according to one or more embodiments shown and described herein.
Figure 6C:
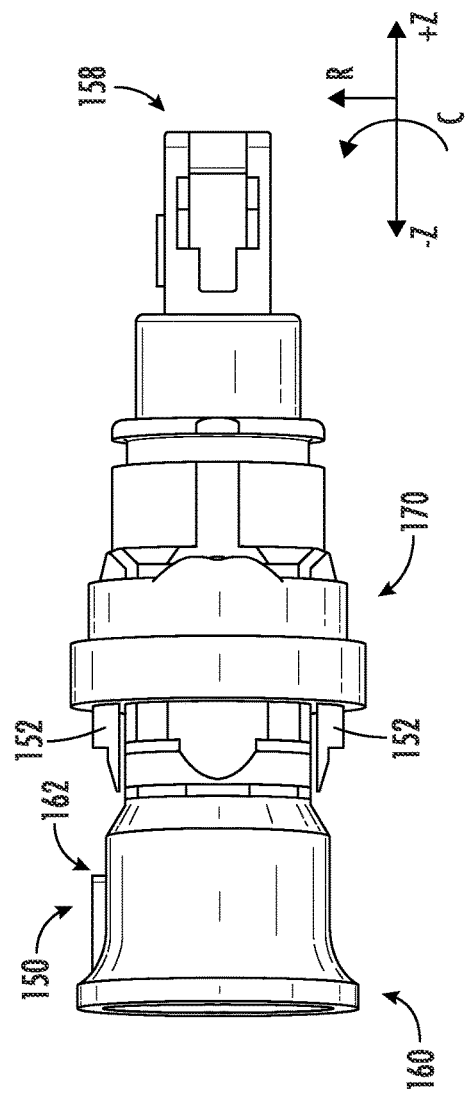
FIG. 6C schematically depicts a side view of the release member inserted at least partially onto the retention housing of FIG. 6B, according to one or more embodiments shown and described herein.

Referring to FIGS. 6A-6C, an isometric view, a front view, and a side view of the retention housing 150 and the release member 170 are schematically depicted, respectively. To assemble the release member 170 to the retention housing 150, the retention housing 150 may be inserted at least partially into the release member 170, and the release member 170 may be moved in the longitudinal direction (i.e., in the −z-direction as depicted) from a retention front end 158 to a retention rear end 160.

Figure 7A:
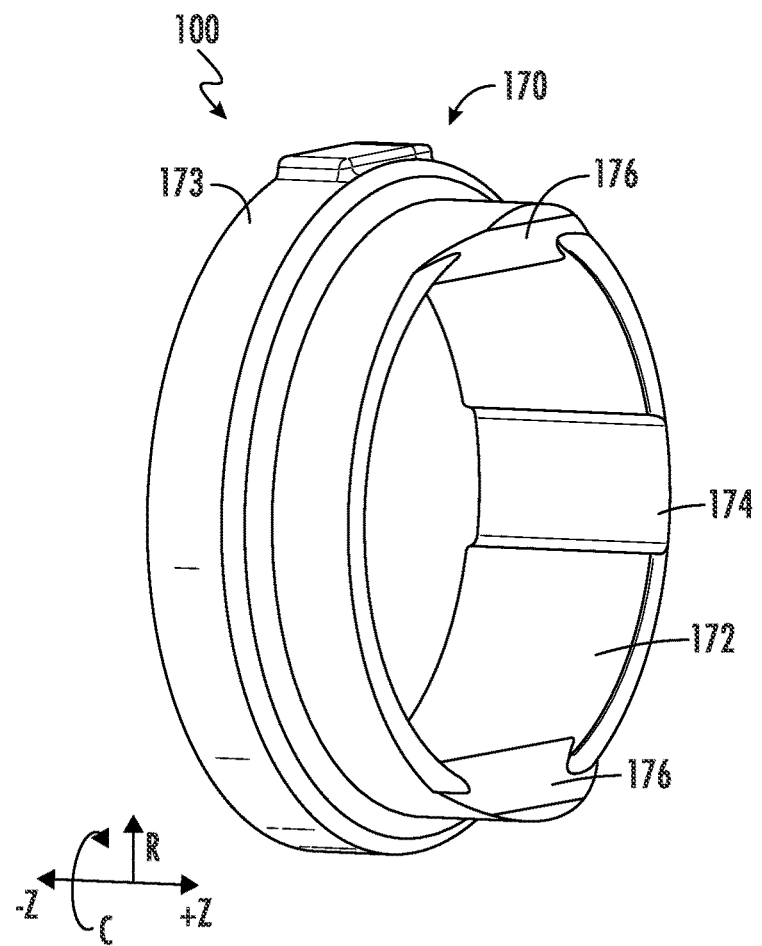
FIG. 7A schematically depicts an isometric view of the release member of FIG. 6A, according to one or more embodiments shown and described herein.
Figure 7B:
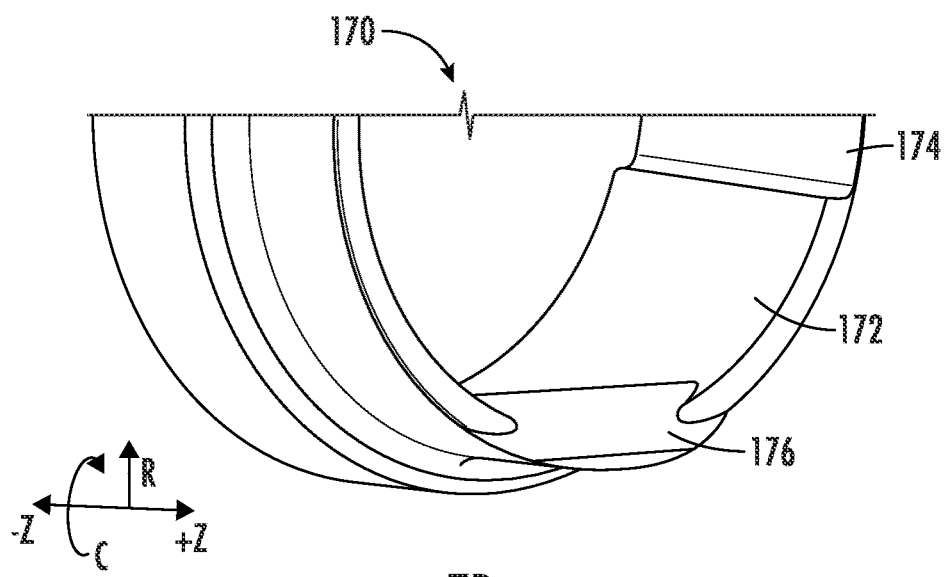
FIG. 7B schematically depicts an enlarged isometric view of a portion of the release member of FIG. 7A, according to one or more embodiments shown and described herein.

Referring to FIGS. 7A and 7B, in some embodiments, the release member 170 defines a release member inner surface 172 and release member outer surface 173. The release member 170 defines one or more installation grooves 174 on the release member inner surface 172. The one or more installation grooves 174, in embodiments, extend along the release member inner surface 172 in the longitudinal direction (i.e., in the +/−z-direction as depicted) and may extend into the release member inner surface 172 in the radial direction R.

The release member 170 may further define one or more release faces 176 that are spaced apart from the one or more installation grooves 174 in the circumferential direction C. In embodiments, the one or more release faces 176 are oriented transverse to the release member inner surface 172. For example, in the embodiment depicted in FIGS. 7A and 7B, the one or more release faces 176 face in the longitudinal direction (i.e., in the +z-direction as depicted) and inwardly in the radial direction R. In the embodiment depicted in FIGS. 7A and 7B, the one or more release faces 176 extend at least partially between the release member inner surface 172 and the release member outer surface 173. The one or more release faces 176 are engageable with the one or more outwardly-extending retention features 152 (FIG. 6A) of the retention housing 150 (FIG. 6A), as described in greater detail herein.

Referring to FIGS. 6A-7B, to install the release member 170 over the retention housing 150, the one or more installation grooves 174 may be rotationally aligned with the one or more outwardly-extending retention features 152 of the retention housing 150. As noted above, the one or more installation grooves 174 generally extend into the release member inner surface 172 such that the release member 170 is movable over the outwardly-extending retention features 152 of the retention housing 150 (i.e., in the −z-direction as depicted). Once the release member 170 is moved over the outwardly-extending retention features 152, the release member 170 may be rotated in the circumferential direction C, such that the one or more release faces 176 are aligned with the outwardly-extending retention features 152 in the circumferential direction C. Once moved over the outwardly-extending retention features 152 and rotated to align the one or more release faces 176 with the outwardly-extending retention features 152 of the retention housing 150, the release member 170 may be captured on the retention housing 150. For example, in some embodiments, the retention housing 150 includes an outwardly-extending rearward retention feature 162, and the release member 170 may be generally restricted from moving rearward in the longitudinal direction (i.e., in the −z-direction with respect to the retention housing 150). Further, the one or more outwardly-extending retention features 152 may restrict the release member 170 from moving forward of the outwardly-extending retention features 152 in the longitudinal direction (i.e., in the +z-direction as depicted).

Figure 8:
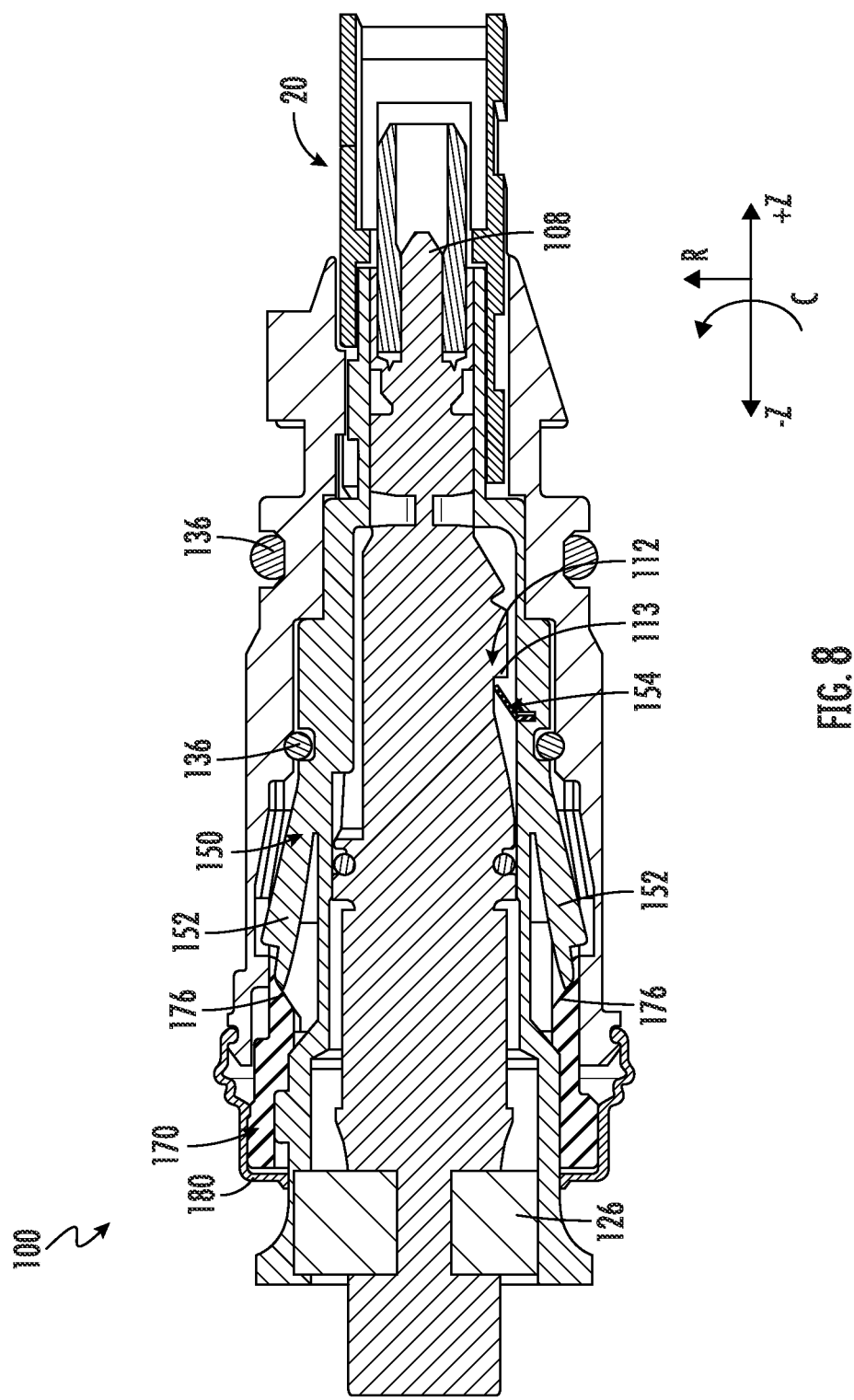
FIG. 8 schematically depicts a section view of the fiber optic connector assembly of FIG. 5 including the connector housing, the retention housing, the release member, and the conversion housing engaged with the coupling, according to one or more embodiments shown and described herein.
Figure 9:
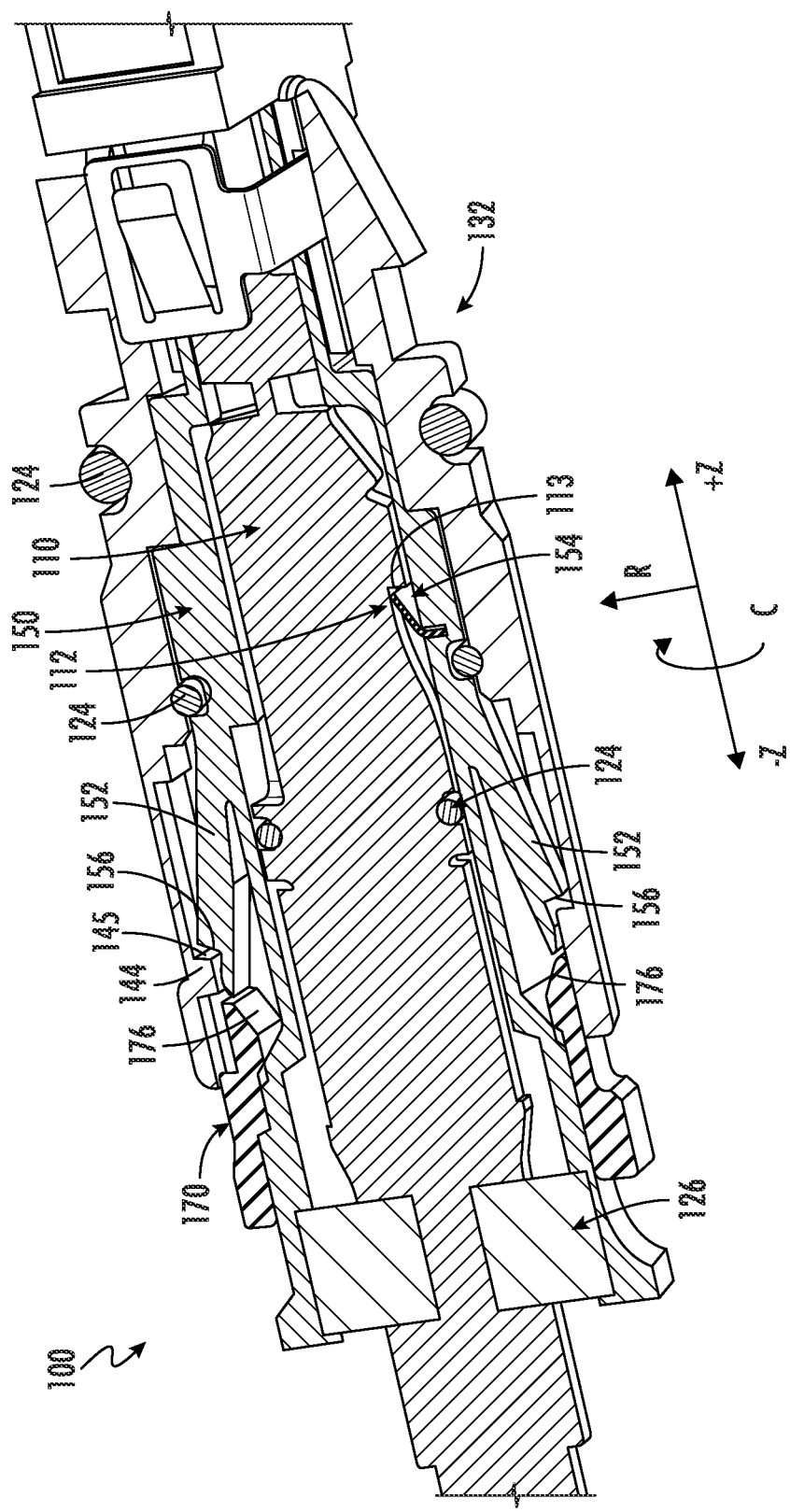
FIG. 9 schematically depicts an isometric section view of the fiber optic connector assembly of FIG. 8, according to one or more embodiments shown and described herein.

Referring to FIGS. 8 and 9, section views of the fiber optic connector assembly 100 are schematically depicted. As shown in FIGS. 8 and 9, when assembled, the connector housing 110 is generally inserted at least partially within the retention housing 150.

In some embodiments, the retention housing 150 includes a connector retention feature 154 engaged with the connector locking face 113 of the connector housing 110. In embodiments, the connector retention feature 154 may restrict movement of the connector housing 110 with respect to the retention housing 150 in a retraction direction (i.e., in the −z-direction as depicted). In some embodiments, the connector retention feature 154 deflect (e.g., elastically deform) outwardly in the radial direction R as the connector housing 110 is inserted within the retention housing 150, and may move inwardly in the locking portion 112 of the connector housing 110 once the connector housing 110 is fully inserted into the retention housing 150.

In some embodiments and as shown in FIG. 8, the fiber optic connector assembly 100 may include a boot cover 180 engaged with the retention housing 150 and the conversion housing 132. In embodiments, the boot cover 180 may at least partially encapsulate the release member 170, and may restrict the passage of environmental elements (e.g., moisture and the like) between the retention housing 150 and the conversion housing 132. The boot cover 180 may be formed of any suitable material, such as rubber or the like that may restrict the passage of environmental elements while allowing a user to manipulate the release member 170 through the boot cover 180.

Figure 10:
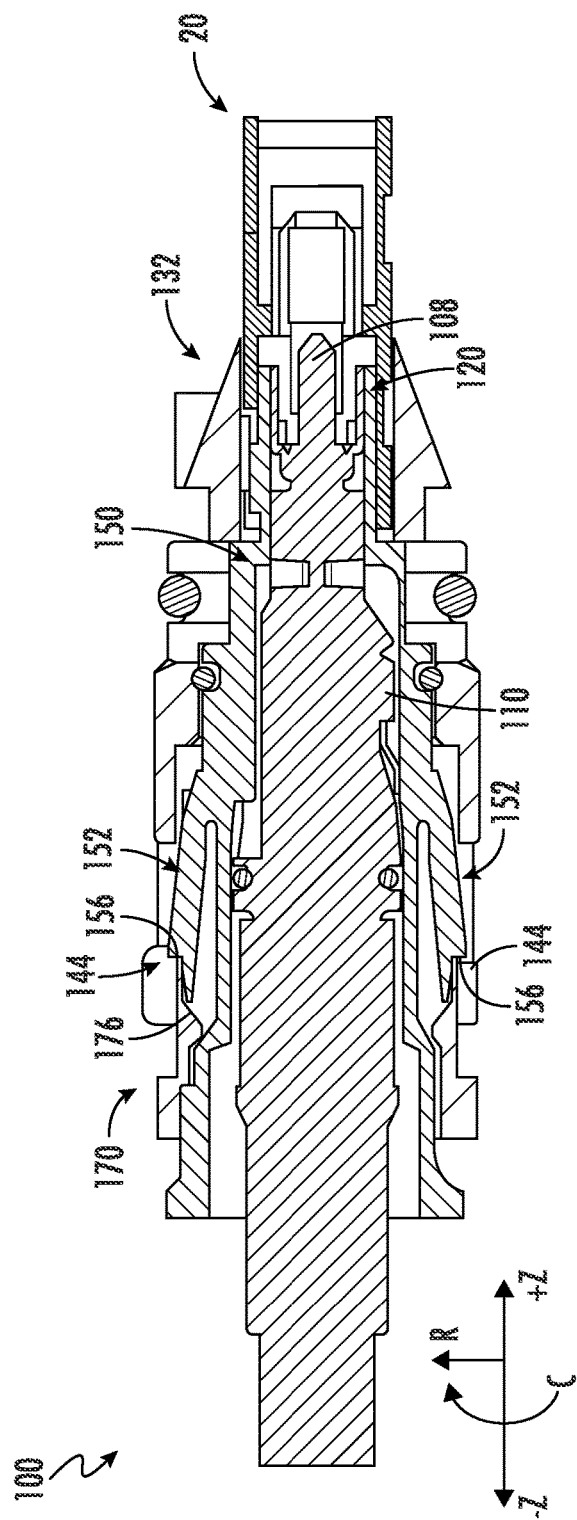
FIG. 10A schematically depicts a section view of the fiber optic connector assembly of FIG. 8 with the release member in an engaged position, according to one or more embodiments shown and described herein.
FIG. 10B schematically depicts a section view of the fiber optic connector assembly of FIG. 10A with the release member in a disengaged position, according to one or more embodiments shown and described herein.

Referring to FIGS. 9 and 10A, the fiber optic connector assembly 100 is depicted with the release member 170 in a disengaged position. With the release member 170 in the disengaged position, axial movement (e.g., movement in the +/−z-direction as depicted) between the conversion housing 132 and the retention housing 150 is restricted. For example, in the embodiment depicted in FIGS. 9 and 10A, the conversion housing 132 defines one or more inner retention features 144 that are selectively engaged with the one or more outwardly-extending retention features 152 of the retention housing 150. In the embodiment depicted in FIGS. 9 and 10A, the one or more inner retention features 144 of the conversion housing 132 defines one or more forwardly-facing release surfaces 145 that are engaged with the one or more outwardly-extending retention features 152 of the retention housing 150.

In embodiments, the one or more outwardly-extending retention features 152 of the retention housing 150 define rearwardly-facing retention engagement faces 156 engaged with conversion housing 132 when the release member 170 is in the engaged position. For example and as shown in FIGS. 9 and 10A, in embodiments, the rearwardly-facing retention engagement faces 156 of the one or more outwardly-extending retention features 152 of the retention housing 150 are engaged with the forwardly-facing release surfaces 145 of the conversion housing 132. In embodiments, the rearwardly-facing retention engagement faces 156 of the retention housing 150 and the forwardly-facing release surfaces 145 of the conversion housing 132 generally oppose one another in the longitudinal direction (i.e., in the +/−z-direction as depicted). As such, with the rearwardly-facing retention engagement faces 156 of the retention housing 150 engaged with the forwardly-facing release surfaces 145 of the conversion housing 132, rearward axial movement (e.g., movement in the −z-direction as depicted) of the retention housing 150 with respect to the conversion housing 132 is restricted. In this way, an axial position of the retention housing 150 may be maintained with respect to the conversion housing 132.

As noted above, in embodiments, engagement between the connector retention feature 154 of the retention housing 150 with the connector locking face 113 of the connector housing 110 may restrict movement of the connector housing 110 with respect to the retention housing 150 in a retraction direction (i.e., in the −z-direction as depicted). Accordingly, through the retention housing 150, rearward axial movement (e.g., movement in the +/−z-direction as depicted) of the connector housing 110 with respect to the conversion housing 132 is restricted. In embodiments, the conversion housing 132 may be engaged with the coupling 20, such that axial movement (e.g., movement in the +/−z-direction as depicted) between the conversion housing 132 and the coupling 20 is restricted. Accordingly, through the conversion housing 132 and the retention housing 150, axial movement (e.g., movement in the +/−z-direction as depicted) of the connector housing 110 with respect to the coupling 20 is restricted.

As noted above, in embodiments, the ferrule 108 is positioned at the connector housing front end 120. Accordingly, by restricting axial movement (e.g., movement in the +/−z-direction as depicted) of the connector housing 110 with respect to the coupling 20, an axial position of the ferrule 108 (i.e., in the +/−z-direction as depicted) within the coupling 20 can be maintained via the connector housing 110, the retention housing 150, and the conversion housing 132. In embodiments, the optical fiber or fibers extending through the ferrule 108 may be optically coupled to a corresponding optical fiber or fibers positioned in the coupling 20, and accordingly, by restricting axial movement (i.e., in the +/−z-direction as depicted) of the ferrule 108 the optical coupling with the corresponding optical fiber or fibers can be maintained.

In embodiments, the release member 170 is positionable between the engaged position, as shown in FIG. 10A, and a disengaged position, as shown in FIG. 10B. In the disengaged position, the retention housing 150 is removable from the conversion housing 132. For example, the release member 170 may be moved forward in the longitudinal direction (i.e., in the +z-direction as depicted) by a user such as a technician or the like to move the release member 170 from the engaged position (FIG. 10A) to the disengaged position (FIG. 10B). As the release member 170 is moved forward in the longitudinal direction (i.e., in the +z-direction as depicted), the release member 170 engages the one or more outwardly-extending retention features 152 of the retention housing 150. In some embodiments and as shown in FIG. 10B, the one or more release faces 176 of the release member 170 engage the one or more outwardly-extending retention features 152 of the retention housing 150 as the release member 170 moves forward in the longitudinal direction (i.e., in the +z-direction as depicted). As noted above, the one or more release faces 176 of the release member 170 face inwardly in the radial direction R. Accordingly, as the one or more release faces 176 of the release member 170 engage the one or more outwardly-extending retention features 152 of the retention housing 150 and the release member 170 moves forward in the longitudinal direction (i.e., in the +z-direction as depicted), the one or more release faces 176 may cause the one or more outwardly-extending retention features 152 to deflect inwardly in the radial direction R. As the one or more outwardly-extending retention features 152 deflect inwardly in the radial direction R, the rearwardly-facing retention engagement faces 156 of the outwardly-extending retention features 152 may disengage from the conversion housing 132. In particular, the rearwardly-facing retention engagement faces 156 of the outwardly-extending retention features 152 disengage from the forwardly-facing release surfaces 142 of the conversion housing 132.

With the outwardly-extending retention features 152 of the retention housing 150 disengaged from the conversion housing 132, the retention housing 150 (and accordingly the connector housing 110) may be removed from the conversion housing 132. For example, the retention housing 150 and the connector housing 110 can be withdrawn from the conversion housing 132 in the longitudinal direction (e.g., in the −z-direction as depicted). In this way, the connector housing 110 can be selectively removed from the coupling 20. Because the connector housing 110 can be disengaged from the conversion housing 140 (and accordingly the coupling 20) without requiring movement of components external to the conversion housing 140 in the radial direction R, couplings 20 can be positioned adjacent to one another so as to minimize the distance between adjacent connector housings 110. In this way, closures 200 (FIG. 1) may include couplings 20 that are positioned adjacent to one another so as to minimize the distance between adjacent connector housings 110.

Figure 11:
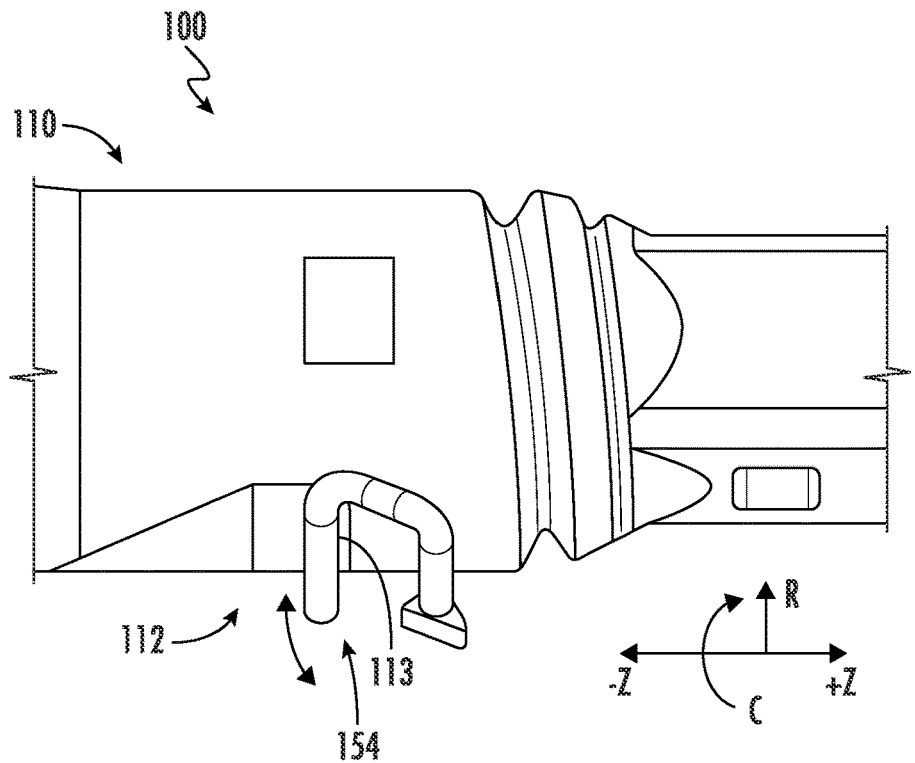
FIG. 11 schematically depicts a side view of the locking portion of the connector housing and another connector retention feature of a retention housing, according to one or more embodiments shown and described herein.
Figure 12:
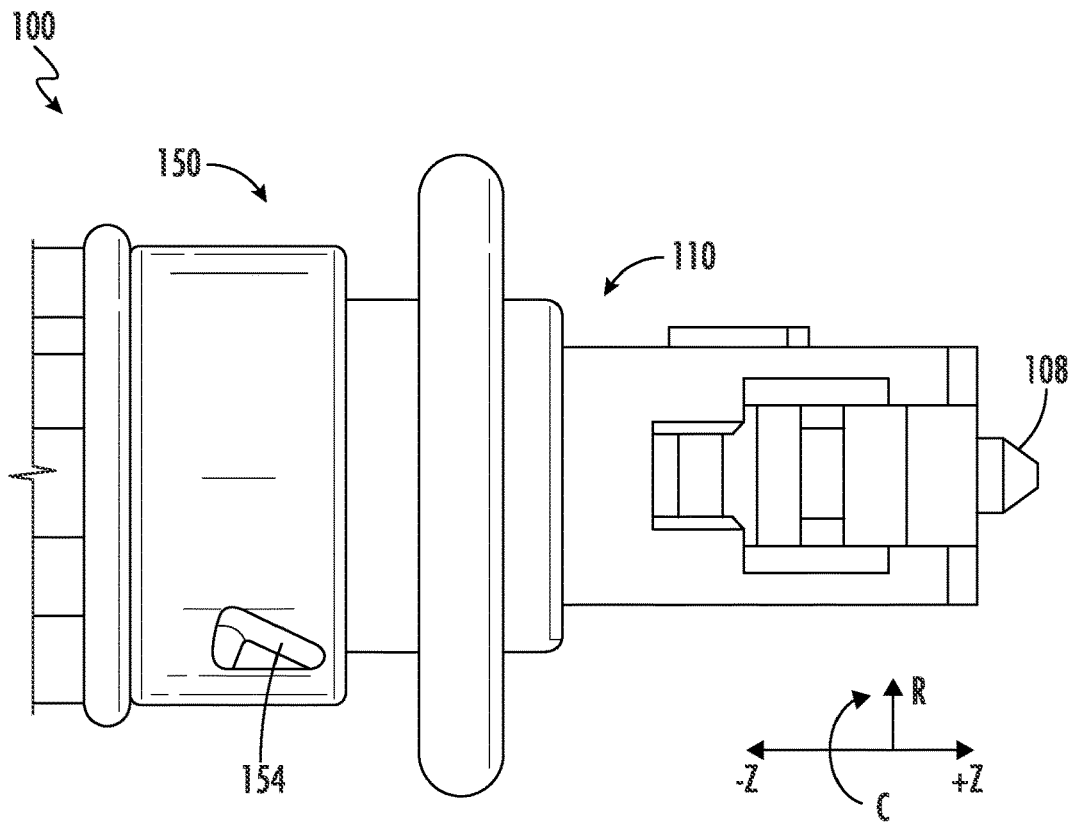
FIG. 12 schematically depicts another side view of the locking portion of the connector housing and the connector retention feature of the retention housing of FIG. 11, according to one or more embodiments shown and described herein.

Referring to FIGS. 11 and 12, a side view of another connector retention feature 154 of the retention housing 150 is schematically depicted. Like the embodiments described above and depicted in FIGS. 8-10B, the connector retention feature 154 engages the connector locking face 113 of the connector housing 110, and restricts rearward movement of the connector housing 110 with respect to the retention housing 150 in the longitudinal direction (i.e., in the −z-direction as depicted). However, in the embodiment depicted in FIGS. 11 and 12, the connector retention feature 154 of the retention housing 150 defines a cylindrical shape engaged with the connector locking face 113. In some embodiments, at least a portion of the connector retention feature 154 is movable and/or rotatable in the radial direction R, such that the connector retention feature 154 may be moved into and out of engagement with the connector locking face 113 of the connector housing 110.

Figure 13:
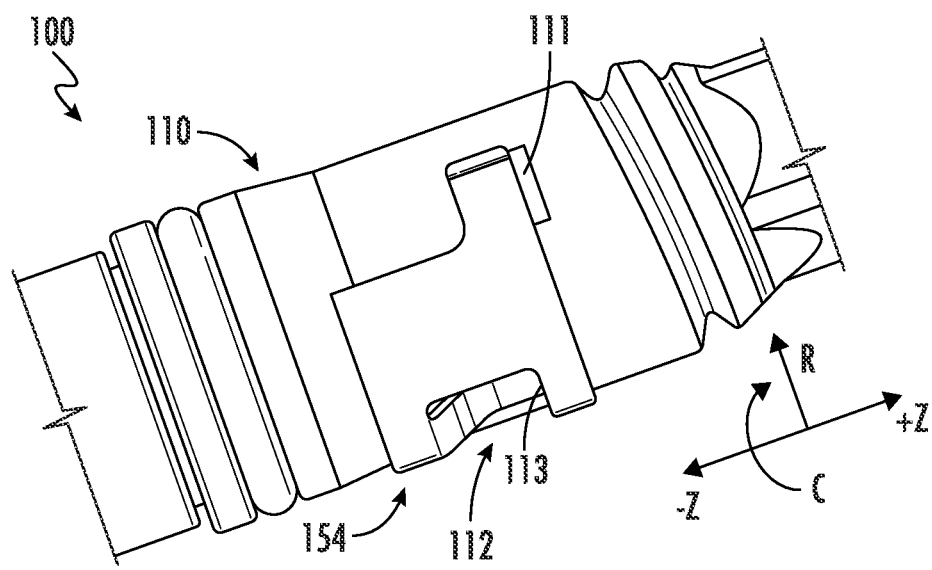
FIG. 13 schematically depicts an isometric view of the locking portion of the connector housing and another connector retention feature of a retention housing, according to one or more embodiments shown and described herein.
Figure 14:
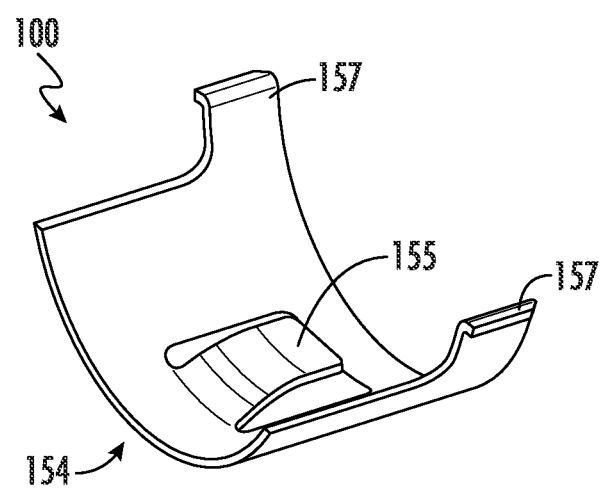
FIG. 14 schematically depicts an isometric view of the connector retention feature of the FIG. 13, according to one or more embodiments shown and described herein.

Referring to FIGS. 13 and 14, isometric views of another connector retention feature 154 and a connector housing 110 are schematically depicted. Like the embodiments described above and depicted in FIGS. 8-12, the connector retention feature 154 engages the connector locking face 113 of the connector housing 110, and restricts rearward movement of the connector housing 110 with respect to the retention housing 150 in the longitudinal direction (i.e., in the −z-direction as depicted). However, in the embodiment depicted in FIGS. 13 and 14, the connector retention feature 154 includes a retaining member 155 and one or more installation members 157. In embodiments, the one or more installation members 157 are configured to engage one or more retention recesses 111 defined on the connector housing 110. As the connector housing 110 is inserted into the retention housing 150, the retaining member 155 of the connector retention feature 154 may elastically deflect outwardly from the connector housing 110 in the radial direction R. When the retaining member 155 is axially aligned with the locking portion 112 of the connector housing 110, the retaining member 155 may move inwardly in the radial direction R and may engage the connector locking face 113 of the connector housing 110.

Figure 15:
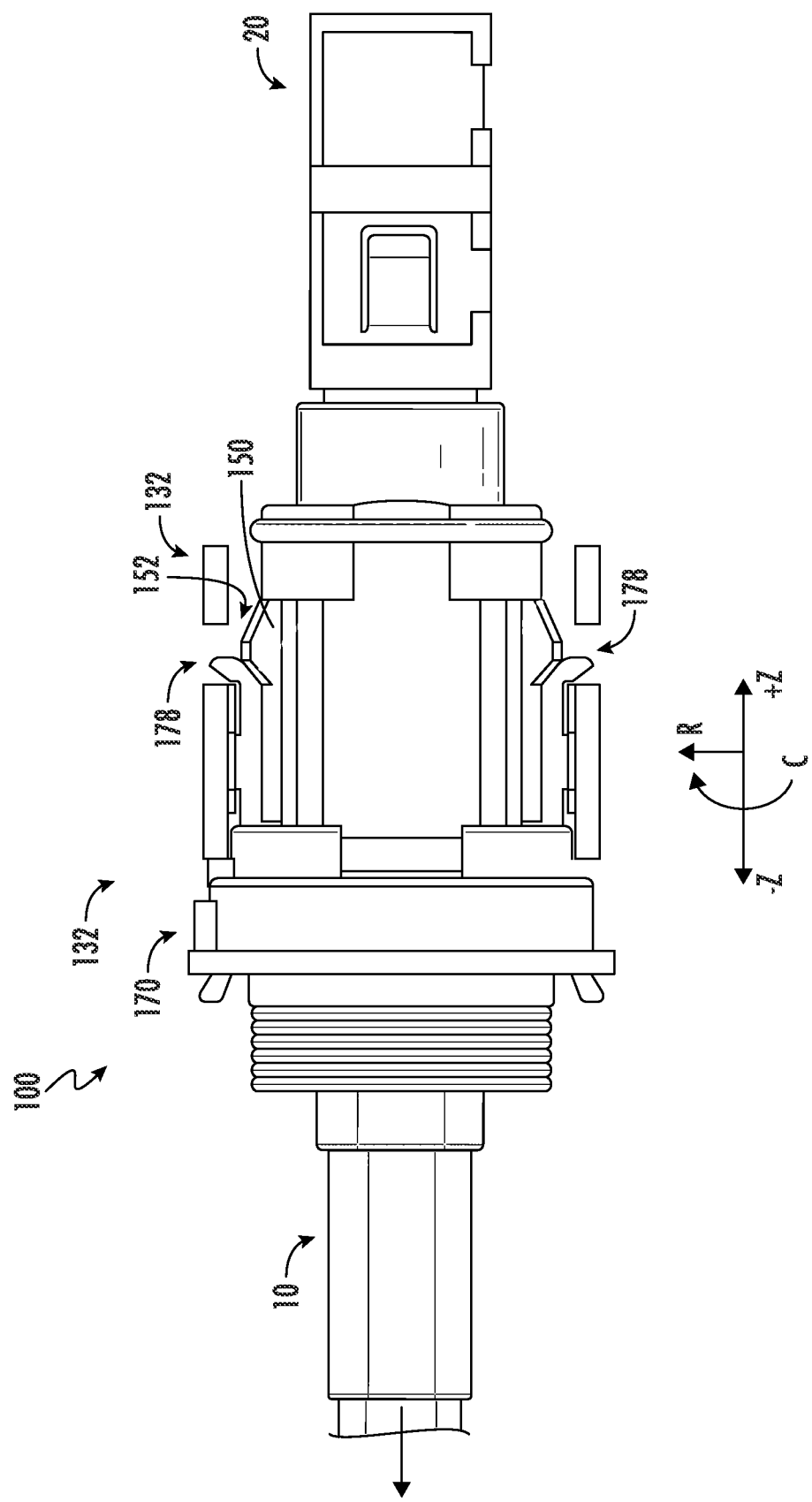
FIG. 15 schematically depicts a section view of another fiber optic connector assembly including a connector housing, a retention housing, a release member, and a conversion housing engaged with a coupling, according to one or more embodiments shown and described herein.

Referring to FIG. 15, a section view of another fiber optic connector assembly 100 is schematically depicted. In the embodiment depicted in FIG. 15, the release member 170 defines one or more outwardly-extending release tabs 178.

For example and referring to FIGS. 16-20, isometric views of the connector housing 110, the retention housing 150, the conversion housing 132, and the release member 170 are schematically depicted. Like the embodiments described above and depicted in FIGS. 2A-10B, the connector housing 110 may be inserted at least partially into the retention housing 150. In embodiments, the retention housing 150 includes the outwardly-extending retention features 152 extending outwardly from the retention housing 150 in the radial direction R. However, in the embodiment depicted in FIGS. 17, the outwardly-extending retention features 152 are not generally movable in the radial direction R.

Figure 21:
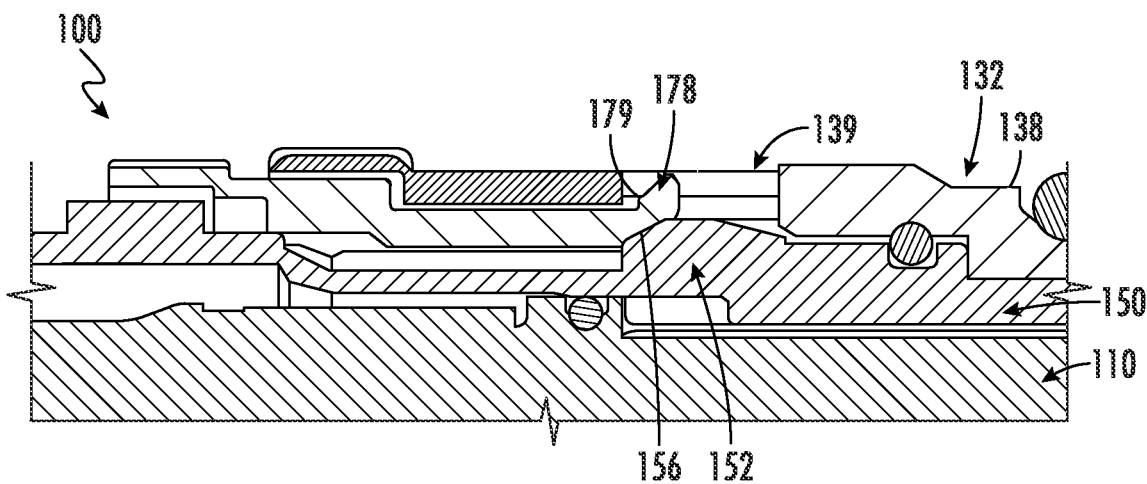
FIG. 21 schematically depicts a section view of the fiber optic connector assembly of FIG. 15 with the release member in an engaged position, according to one or more embodiments shown and described herein.

Instead and as shown in FIG. 21, the one or more outwardly-extending release tabs 178 are positionable between the one or more outwardly-extending retention features 152 of the retention housing 150 and the conversion housing 132 in the engaged position. For example, in some embodiments, the outwardly-extending release tabs 178 are positioned between the one or more outwardly-extending retention features 152 of the retention housing 150 and the conversion housing 132 in the longitudinal direction (i.e., in the +/−z-direction as depicted).

In some embodiments, the conversion housing 132 defines a conversion sidewall 138 extending in the axial direction (i.e., in the +/−z-direction as depicted) and the inner retention features 144 are defined on the conversion sidewall 138. For example, in the embodiment depicted in FIG. 21, the conversion housing 132 defines one or more apertures 139 extending through the conversion sidewall 138, and the one or more apertures 139 define the inner retention features 144. In embodiments, at least a portion of the one or more outwardly-extending release tabs 178 of the release member 170 are positioned at least partially within the aperture 139 in the engaged position.

Figure 22:
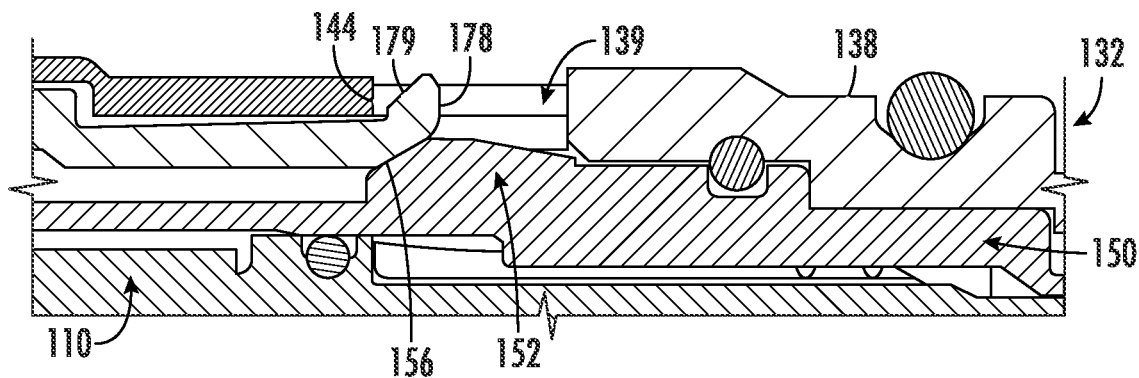
FIG. 22 schematically depicts an enlarged section view of the fiber optic connector assembly of FIG. 15 with the release member in the engaged position, according to one or more embodiments shown and described herein.

In the embodiment depicted in FIG. 21, the rearwardly-facing retention engagement faces 156 of the of the one or more outwardly-extending retention features 152 of the retention housing 150 may face at least partially outwardly in the radial direction R. Accordingly, and referring to FIG. 22, in instances in which the retention housing 150 is moved rearward in the longitudinal direction (i.e., in the −z-direction as depicted), the rearwardly-facing retention engagement faces 156 of the one or more outwardly-extending retention features 152 may move the outwardly-extending release tabs 178 of the release member 170 outward in the radial direction R. As the outwardly-extending release tabs 178 of the release member 170 move outward in the radial direction R, the outwardly-extending release tabs 178 of the release member 170 may engage the inner retention features 144 of the conversion housing 132. Engagement with the inner retention features 144 of the conversion housing 132 may restrict movement of the release member 170 in the longitudinal direction (i.e., in the −z-direction as depicted). Further, engagement between the outwardly-extending release tabs 178 of the release member 170 and the outwardly-extending retention features 152 may restrict movement of the retention housing 150 (and accordingly the connector housing 110) in the longitudinal direction (i.e., in the −z-direction as depicted). In this way, the outwardly-extending release tabs 178 and the aperture 139 may restrict inadvertent release of the connector housing 110 and the retention housing 150.

Figure 23:
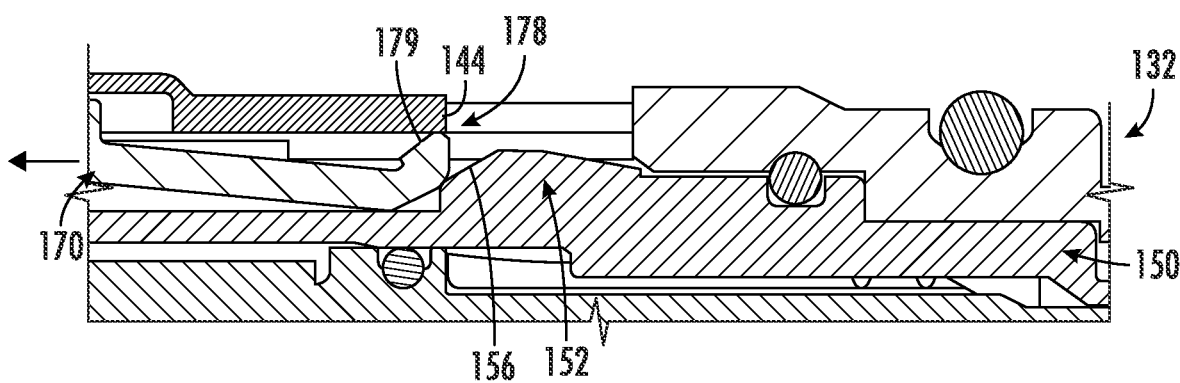
FIG. 23 schematically depicts a section view of the fiber optic connector assembly with the release member in a disengaged position, according to one or more embodiments shown and described herein.

However and referring to FIG. 23, in embodiments, the release member 170 may be moved rearward in the longitudinal direction (i.e., in the −z-direction as depicted) with respect to the conversion housing 132 and the retention housing 150. As the release member 170 moves rearward in the longitudinal direction (i.e., in the −z-direction as depicted), a contact face 179 of the one or more outwardly-extending release tabs 178 of the release member 170 may engage the inner retention feature 144 of the aperture 139, and the one or more outwardly-extending release tabs 178 may move inwardly in the radial direction R. As the one or more outwardly-extending release tabs 178 move inwardly in the radial direction R, the one or more outwardly-extending release tabs 178 of the release member 170 may be spaced apart from the aperture 139 in a disengaged position. With the one or more outwardly-extending release tabs 178 of the release member 170 spaced apart from the aperture 139, the retention housing 150 may be moved rearward in the longitudinal direction (i.e., in the −z-direction as depicted) without causing the outwardly-extending release tabs 178 of the release member 170 to engage the inner retention feature 144 of the aperture 139. Accordingly, with the one or more outwardly-extending release tabs 178 in the disengaged position, the retention housing 150 and accordingly the connector housing 110 can be removed from the conversion housing 132. In this way, the connector housing 110 can be restricted from being removed from the conversion housing 132 unless the release member 170 is moved rearwardly (i.e., in the −z-direction as depicted) with respect to the retention housing 150 and the conversion housing 132.

Accordingly, it should now be understood that embodiments described herein are directed to fiber optic connector assemblies including a connector housing and an adapter assembly including a conversion housing, a retention housing, and a release member. The conversion housing may generally permit the connector housing to be engaged with a dissimilar coupling, for example of a closure. The connector housing may be selectively coupled to, and may be releasable from the conversion housing via the release member, thereby allowing the connector housing to be selectively coupled to and released from the dissimilar coupling and/or closure.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A fiber optic connector assembly comprising:
   a connector housing defining a locking portion defined on an outer surface of the connector housing;
   an adapter assembly selectively coupled to the connector housing, the adapter assembly comprising:
   a conversion housing extending around the connector housing and defining a conversion front end;
   a retention housing comprising a connector retention feature engaged with the locking portion of the connector housing and the retention housing defining one or more outwardly-extending retention features; and
   a release member, engageable with the retention housing, wherein the release member is positionable between an engaged position, in which axial movement between the retention housing and the conversion housing is restricted, and a disengaged position, in which the retention housing is removable from the conversion housing,
   wherein the release member defines a release member inner surface and one or more installation grooves extending into the release member inner surface, wherein the one or more installation grooves are spaced apart from the forwardly-facing release surface in a circumferential direction.

2. The fiber optic connector assembly of claim 1, wherein: the one or more outwardly-extending retention features of the retention housing are engaged with the conversion housing with the release member in the disengaged position and disengaged with the conversion housing with the release member in the engaged position.

3. The fiber optic connector assembly of claim 2, wherein the conversion housing defines a forwardly-facing release surface engaged with the one or more outwardly-extending retention features of the retention housing.

4. The fiber optic connector assembly of claim 3, wherein the forwardly-facing release surface faces inward in a radial direction.

5. The fiber optic connector assembly of claim 2, wherein the release member defines an annular shape positioned around the retention housing.

6. The fiber optic connector assembly of claim 1, wherein the one or more outwardly-extending retention features of the retention housing define a rearwardly-facing retention engagement face engaged with the conversion housing with the release member in the engaged position.

7. The fiber optic connector assembly of claim 2, wherein the conversion housing defines a forwardly-facing release surface that is engaged with the one or more outwardly-extending retention features of the retention housing with the release member in the disengaged position.

8. The fiber optic connector assembly of claim 1, further comprising a rear seal engaged with the retention housing and the conversion housing, wherein the rear seal at least partially encapsulates the release member.

9. The fiber optic connector assembly of claim 1, further comprising a boot cover engaged with the retention housing and the conversion housing, wherein the boot cover at least partially encapsulates the release member.

10. The fiber optic connector assembly of claim 1, wherein:
the release member is engaged with the conversion housing in the engaged position; and
the release member is disengaged from the conversion housing in the disengaged position.

11. The fiber optic connector assembly of claim 10, wherein the release member defines one or more outwardly-extending release tabs, and wherein the one or more outwardly-extending release tabs are positioned between the one or more outwardly-extending retention features of the retention housing and the conversion housing in the engaged position.

12. The fiber optic connector assembly of claim 11, wherein the conversion housing defines a conversion sidewall extending in an axial direction and an aperture extending through the conversion sidewall.

13. The fiber optic connector assembly of claim 12, wherein at least a portion of one or more outwardly-extending release tabs of the release member are positioned at least partially within the aperture in the engaged position, and wherein the one or more outwardly-extending release tabs of the release member are spaced apart from the aperture in the disengaged position.

* * * * *

UNITED STATES PATENT AND TRADEMARK OFFICE
CERTIFICATE OF CORRECTION

PATENT NO. : 11,927,810 B2  
APPLICATION NO. : 17/527302  
DATED : March 12, 2024  
INVENTOR(S) : Guy Barthes et al.

It is certified that error appears in the above-identified patent and that said Letters Patent is hereby corrected as shown below:

On the Title Page

In item (56), in Column 2, under "Other Publications", Line 1, delete "Plasti" and insert -- Plastic --.

On the page 9, item (56), in Column 2, under "Foreign Patent Documents", Line 58, delete "IN" and insert -- CN --.

On the page 10, item (56), in Column 1, under "Foreign Patent Documents", Line 59, delete "JP" and insert -- WO --.

On the page 10, item (56), in Column 1, under "Foreign Patent Documents", Line 63, delete "NO" and insert -- WO --.

On the page 10, item (56), in Column 1, under "Foreign Patent Documents", Line 64, delete "NO" and insert -- WO --.

On the page 10, item (56), in Column 1, under "Foreign Patent Documents", Line 65, delete "NO" and insert -- WO --.

On the page 10, item (56), in Column 1, under "Foreign Patent Documents", Line 66, delete "NO" and insert -- WO --.

On the page 11, item (56), in Column 2, under "Other Publications", Line 2, delete "Poeceedings" and insert -- Proceedings --.

On the page 11, item (56), in Column 2, under "Other Publications", Line 8, delete "Ughtwave.," and insert -- Lightwave., --.

Signed and Sealed this  
Second Day of July, 2024

Katherine Kelly Vidal  
*Director of the United States Patent and Trademark Office*